(12) United States Patent
Su

(10) Patent No.: US 12,539,805 B2
(45) Date of Patent: Feb. 3, 2026

(54) INTELLIGENT LIGHT SWITCHING METHOD AND SYSTEM, AND RELATED DEVICE

(71) Applicant: SHENZHEN YINWANG INTELLIGENT TECHNOLOGIES CO., LTD., Shenzhen (CN)

(72) Inventor: Wenyao Su, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 356 days.

(21) Appl. No.: 18/307,615

(22) Filed: Apr. 26, 2023

(65) Prior Publication Data
US 2023/0256896 A1    Aug. 17, 2023

Related U.S. Application Data

(63) Continuation of application No. PCT/CN2021/114823, filed on Aug. 26, 2021.

(30) Foreign Application Priority Data

Oct. 31, 2020    (CN) .......................... 202011197967.5

(51) Int. Cl.
*B60Q 1/14*    (2006.01)
*G06V 10/22*    (2022.01)
(Continued)

(52) U.S. Cl.
CPC ........... *B60Q 1/1423* (2013.01); *G06V 10/22* (2022.01); *G06V 10/56* (2022.01); *G06V 10/60* (2022.01);
(Continued)

(58) Field of Classification Search
None
See application file for complete search history.

(56) References Cited

U.S. PATENT DOCUMENTS

| | | | |
|---|---|---|---|
| 7,566,851 | B2 | 7/2009 | Stein et al. |
| 9,459,515 | B2 | 10/2016 | Stein |

(Continued)

FOREIGN PATENT DOCUMENTS

| | | |
|---|---|---|
| CN | 102609938 B | 4/2014 |
| CN | 106080372 A | 11/2016 |

(Continued)

OTHER PUBLICATIONS

Office Action in Japanese Appln. No. 2023-526210, mailed on Jul. 2, 2024, 6 pages (with English translation).

(Continued)

*Primary Examiner* — Wilson Lee
(74) *Attorney, Agent, or Firm* — Fish & Richardson P.C.

(57) ABSTRACT

This application provides an intelligent light switching method and system, and a related device. One example method includes: The intelligent light switching system obtains an image, where the image comprises lamp source information; calculates an ambient light brightness value corresponding to the image; classifies, based on the lamp source information, a lamp source included in the image to obtain a classification result; and switches to a high beam or a low beam based on the ambient light brightness value corresponding to the image and the classification result.

18 Claims, 9 Drawing Sheets

(51) Int. Cl.
    *G06V 10/56* (2022.01)
    *G06V 10/60* (2022.01)
    *G06V 10/764* (2022.01)
    *G06V 10/774* (2022.01)
    *G06V 20/56* (2022.01)
    *H05B 47/11* (2020.01)

(52) U.S. Cl.
    CPC .......... *G06V 10/764* (2022.01); *G06V 10/774* (2022.01); *G06V 20/56* (2022.01); *H05B 47/11* (2020.01); *B60Q 2300/314* (2013.01)

(56) References Cited

U.S. PATENT DOCUMENTS

| | | | | |
|---|---|---|---|---|
| 11,227,409 | B1* | 1/2022 | Wu | H04N 17/002 |
| 2009/0010494 | A1* | 1/2009 | Bechtel | G01S 11/12 |
| | | | | 382/104 |
| 2016/0162741 | A1* | 6/2016 | Shin | G06V 20/56 |
| | | | | 382/104 |
| 2017/0015236 | A1* | 1/2017 | Masuda | F21S 41/143 |
| 2018/0060669 | A1* | 3/2018 | Pham | G06T 7/80 |
| 2019/0163993 | A1* | 5/2019 | Koo | G06V 20/588 |
| 2020/0164770 | A1* | 5/2020 | Lee | B60Q 1/5035 |
| 2020/0215970 | A1* | 7/2020 | Lee | G06V 10/764 |
| 2021/0243346 | A1* | 8/2021 | Bhatia | G09G 5/10 |
| 2022/0005169 | A1* | 1/2022 | Park | H04N 23/71 |
| 2022/0343648 | A1* | 10/2022 | Chen | H04N 5/772 |

FOREIGN PATENT DOCUMENTS

| | | |
|---|---|---|
| JP | 2014231301 A | 12/2014 |
| JP | 2017097658 A | 6/2017 |

OTHER PUBLICATIONS

Extended European Search Report in European Appln No. 21884633.5, dated Dec. 21, 2023, 7 pages.

* cited by examiner

INTELLIGENT LIGHT SWITCHING METHOD AND SYSTEM, AND RELATED DEVICE

CROSS-REFERENCE TO RELATED APPLICATIONS

This application is a continuation of International Application No. PCT/CN2021/114823, filed on Aug. 26, 2021, which claims priority to Chinese Patent Application No. 202011197967.5, filed on Oct. 31, 2020. The disclosures of the aforementioned applications are hereby incorporated by reference in their entireties.

TECHNICAL FIELD

This application relates to the field of intelligent vehicles, and in particular, to an intelligent light switching method and system, and a related device.

BACKGROUND

It is well known that driving at night needs a high beam and a low beam for illumination, helping a driver obtain road information. Compared with the low beam, the high beam has a more significant effect in improving a line of sight and broadening a field of sight. Particularly, on a dark road without street lamps, a visible range in a scenario in which the high beam is turned on is far greater than a visible range in a scenario in which the low beam is turned on. However, using a high beam is not applicable to all night driving scenarios. For example, if a driver driving a vehicle at night turns on a high beam when meeting a vehicle in an opposite direction, a driver of the vehicle in the opposite direction may be visually blinded instantly, or a driver of the vehicle in the opposite direction may be less aware of a speed and a distance and be less capable of judging a width. Therefore, using a high beam correctly is crucial to safe driving at night. An intelligent light switching technology rises to the occasion to resolve, from a source, a problem that a driver uses a high beam in a wrong manner.

Among existing intelligent light switching methods, a driver may be helped, in the following three manners, to switch between a high beam and a low beam: distinguishing a lamp source based on different image features that are presented by the lamp source in different exposure times; directly calculating brightness of front ambient light; and obtaining a vanishing point based on a lane line. However, implementation effects of the foregoing methods are not ideal. Implementation according to the first method has a relatively high requirement on a camera module, and thus the implementation according to this method requires relatively high costs. In the second method, impact of brightness of a distant headlight is ignored, causing a relatively large error in brightness calculation of ambient light. Implementation according to the third method depends on accurate obtaining of a lane line, but a probability of accurately obtaining a lane line at night is extremely low.

Therefore, how to accurately switch to a high beam or a low beam is an urgent problem to be resolved at present.

SUMMARY

This application provides an intelligent light switching method and system, and a related device, which can accurately detect ambient light brightness, and accurately classify lamp source information. After the two types of information are fused, a function of switching to a high beam or a low beam can be performed accurately, thereby effectively resolving a problem that a distant light source is not detected, and avoiding impact of an interference light source.

According to a first aspect, this application provides an intelligent light switching method. The method includes: obtaining an image, where the image is shot by a video camera disposed at a fixed position of a vehicle, and lamp source information is recorded in the image; calculating an ambient light brightness value corresponding to the image; classifying, based on the lamp source information, a lamp source included in the image to obtain a classification result; and switching to a high beam or a low beam (performing light switching) based on the ambient light brightness value corresponding to the image and the classification result.

The solution provided in this application sequentially includes the following steps: obtaining the image; calculating the ambient light brightness; classifying the lamp source; and determining, based on the result, whether to perform light switching. In the light switching method, the ambient light information and the lamp source information are combined, so that more information related to a road at night may be used for reference during determining of whether to perform light switching, thereby improving accuracy of light switching.

With reference to the first aspect, in a possible implementation of the first aspect, the calculating an ambient light brightness value corresponding to the image includes: selecting at least one region from the image; calculating a brightness value of the at least one region; and calculating, based on the brightness value of the at least one region, the ambient light brightness value corresponding to the image.

In the solution provided in this application, the ambient light brightness value is calculated by selecting the at least one region, calculating the brightness value of the at least one region, and obtaining the ambient light brightness value based on the brightness value. In this manner, information about lamp sources that may exist in different regions of the image is fully considered. Compared with calculating the ambient light brightness based on only an entire image, the method provided in this application can obtain the ambient light brightness more accurately.

With reference to the first aspect, in a possible implementation of the first aspect, the classifying a lamp source included in the image to obtain a classification result includes: inputting the image into a lamp source detection model, and obtaining a lamp source category in the image based on the lamp source detection model.

In the solution provided in this application, lamp source classification is implemented by using the lamp source detection model. After training, the lamp source detection model can quickly and accurately implement lamp source classification based on features, such as a size, a position, and a color, of the lamp source.

With reference to the first aspect, in a possible implementation of the first aspect, before the inputting the image into a lamp source detection model, the method further includes: training the lamp source detection model by using a plurality of sample images, where the sample images include the lamp source and annotation information of the lamp source.

In the solution provided in this application, training needs to be performed on the lamp source detection model before the lamp source detection model is formally used. The training is a process of recognizing an initial model and learning lamp source information in the sample images. After the training is completed, the lamp source detection model can accurately recognize different features of different lamp sources, thereby improving accuracy of lamp source classification.

With reference to the first aspect, in a possible implementation of the first aspect, the obtaining a lamp source category in the image based on the lamp source detection model includes: selecting, from the image, a bright spot whose brightness value is greater than a preset threshold, and setting a lamp box for the bright spot; performing pairing on the lamp box to obtain a plurality of lamp box pairs; determining a VP line based on the plurality of lamp box pairs, where the VP line is used to distinguish between a first region and a second region of the image; and classifying the bright spot based on a position relationship between the bright spot and the VP line and a color feature of the bright spot, to obtain different lamp source categories.

In the solution provided in this application, to implement lamp source classification, first, the bright spot that is in the image and that has relatively high brightness needs to be obtained and needs to be provided with the lamp box. This is preliminary filtering for light sources. Then, lamp source pairing is performed based on a relationship between vehicle lamp pairs. Compared with single recognition, this pairing manner improves classification efficiency and accuracy. Then, the vanishing point horizontal line VP line is determined based on distribution of the lamp box pairs in the image. Finally, the bright spot is classified based on the position relationship between the bright spot and the VP line and features, such as brightness and color, of the bright spot. It may be understood that after the VP line is determined, a region including a vehicle lamp and a region including a street lamp and a signal lamp can be roughly divided, making a subsequent classification process more accurate and effective.

With reference to the first aspect, in a possible implementation of the first aspect, before the performing pairing on the lamp box, the method further includes: performing overlap removal on the lamp box, to ensure that there is no overlap or tangent between lamp boxes.

In the solution provided in this application, overlap removal needs to be performed on the lamp box before pairing, to ensure that there is no overlap or tangent between lamp boxes. Therefore, it is ensured that the lamp boxes do not affect each other in a subsequent classification process, to improve accuracy of lamp source classification.

With reference to the first aspect, in a possible implementation of the first aspect, the determining a vanishing point horizontal line VP line based on the plurality of lamp box pairs includes: mapping lamp box centers of the lamp box pairs onto rows in the image, to obtain an in-row quantity distribution map of the lamp box pairs; selecting a VP line based on the in-row quantity distribution map; correcting the VP line based on a preset correction value, to obtain a corrected VP line; and adjusting the corrected VP line by using a reference value, to obtain a VP line used to classify the bright spot, where the reference value is used to describe a change of a pitch angle of the video camera.

In the solution provided in this application, the VP line is initially determined based on the in-row quantity distribution map of the lamp box pairs. Subsequently, the VP line needs to be corrected by using the introduced reference value, so that a finally obtained VP line is more accurate. Therefore, accuracy of subsequent lamp source classification is improved.

According to a second aspect, this application provides an intelligent light switching system. The system includes: an obtaining unit, configured to obtain an image, where the image is shot by a video camera disposed at a fixed position of a vehicle, and lamp source information is recorded in the image; an ambient light detection unit, configured to calculate an ambient light brightness value corresponding to the image; a lamp source classification unit, configured to classify, based on the lamp source information, a lamp source included in the image to obtain a classification result; and a switching unit, configured to switch to a high beam or a low beam based on the ambient light brightness value corresponding to the image and the classification result.

With reference to the second aspect, in a possible implementation of the second aspect, the ambient light detection unit is specifically configured to: select at least one region from the image; calculate a brightness value of the at least one region; and calculate, based on the brightness value of the at least one region, the ambient light brightness value corresponding to the image.

With reference to the second aspect, in a possible implementation of the second aspect, when classifying the lamp source included in the image to obtain the classification result, the lamp source classification unit is specifically configured to: input the image into a lamp source detection model, and obtain a lamp source category in the image based on the lamp source detection model.

With reference to the second aspect, in a possible implementation of the second aspect, before inputting the image into the lamp source detection model, the lamp source classification unit is further configured to train the lamp source detection model by using a plurality of sample images, where the sample images include the lamp source and a label of the lamp source.

With reference to the second aspect, in a possible implementation of the second aspect, when obtaining the lamp source category in the image based on the lamp source detection model, the lamp source classification unit is specifically configured to: select, from the image, a bright spot whose brightness value is greater than a preset threshold, and set a lamp box for the bright spot; perform pairing on the lamp box to obtain a plurality of lamp box pairs; determine a vanishing point horizontal line VP line based on the plurality of lamp box pairs, where the VP line is used to distinguish between a first region and a second region of the image; and classify the bright spot based on a position relationship between the bright spot and the VP line and a color feature of the bright spot, to obtain different lamp source categories.

With reference to the second aspect, in a possible implementation of the second aspect, before performing pairing on the lamp box, the lamp source classification unit is further configured to perform overlap removal on the lamp box, to ensure that there is no overlap or tangent between lamp boxes.

With reference to the second aspect, in a possible implementation of the second aspect, when determining the vanishing point horizontal line VP line based on the plurality of lamp box pairs, the lamp source classification unit is specifically configured to: map lamp box centers of the lamp box pairs onto rows in the image, to obtain an in-row quantity distribution map of the lamp box pairs; select a VP line based on the in-row quantity distribution map; correct the VP line based on a preset correction value, to obtain a corrected VP line; and adjust the corrected VP line by using a reference value, to obtain a VP line used to classify the bright spot, where the reference value is used to describe a change of a pitch angle of the video camera.

According to a third aspect, a computing device is provided. The computing device includes a processor and a memory. The memory is configured to store program code. The processor is configured to execute the program code in the memory, thereby performing the intelligent light switching method according to the first aspect with reference to any implementation of the first aspect.

According to a fourth aspect, a computer-readable storage medium is provided. The computer-readable storage medium stores a computer program. When the computer program is executed by a processor, the processor performs the intelligent light switching method according to the first aspect with reference to any implementation of the first aspect.

According to a fifth aspect, a computer program product is provided. The computer program product includes instructions. When the computer program product is executed by a computer, the computer is enabled to perform the intelligent light switching procedure according to the first aspect with reference to any implementation of the first aspect.

DESCRIPTION OF EMBODIMENTS

Figure 1:
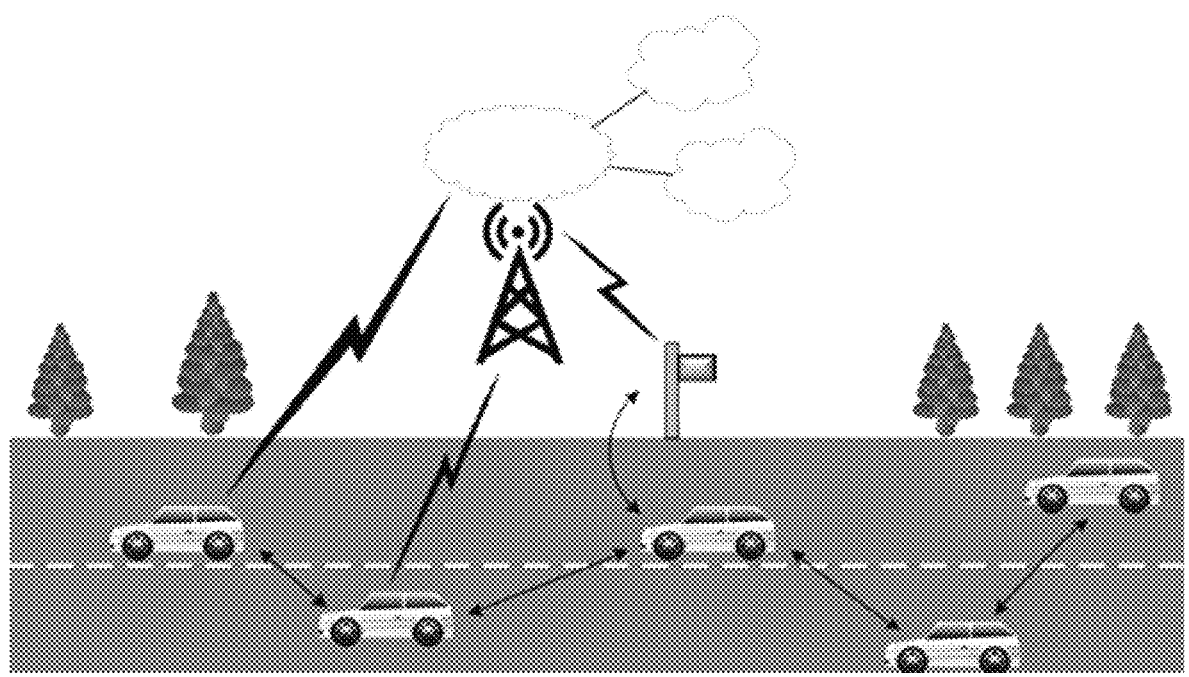
FIG. 1 is a schematic diagram of an application scenario of an intelligent light switching method according to an embodiment of this application.

The following clearly and completely describes technical solutions in embodiments of this application with reference to accompanying drawings. Apparently, the described embodiments are merely some rather than all of the embodiments of this application. All other embodiments obtained by persons of ordinary skill in the art based on embodiments of this application without creative efforts shall fall within the protection scope of this application.

Some terms and related technologies in this application are first described with reference to the accompanying drawings, to help persons skilled in the art have a better understanding.

In an RGB color space, different degrees of overlapping is performed based on basic colors: red, green, and blue, to generate rich and extensive colors. Therefore, the RGB color space is commonly known as a three-primitive-color mode, and is also referred to as a natural-color mode. Red, green, and blue represent three basic colors (three primary colors) in a visible spectrum. Each of the colors is divided into 256 levels based on different brightness. When three primary colors of colored light overlap, various intermediate colors can be generated due to different color mixing ratios. A display system generally uses the RGB color space. A display having a color cathode-ray tube and displaying color raster graphics drives, by using R, G, and B values, R, G, and B electron guns to emit electrons, and stimulates R, G, and B fluorescent powder on a fluorescent screen to emit light rays having different brightness. The light rays are overlapped to generate various colors.

A YUV color space includes one brightness signal and two chrominance signals. The brightness signal is usually called Y. The chrominance signals are two independent signals (a chrominance signal representing red and a chrominance signal representing blue). The two chrominance signals are usually called UV, PbPr, or CbCr. Therefore, the YUV color space is also called YPbPr color space or YCbCr color space. Brightness information is separated from chrominance information. Different sampling rates are used for brightness and chrominance of images in a same frame. In the YUV color space, the brightness information Y and the chrominance information U\V are independent of each other. A Y signal component is a black-and-white gray-scale map. A U signal component and a V signal component are monochrome color maps. Because human vision is more sensitive to brightness than to chrominance, the YUV color space is widely used in color television systems.

An HSI color space uses three parameters H, S, and I to describe color features. H denotes a color frequency, which is called hue. S denotes color depth, which is called saturation. I denotes intensity or brightness.

Region of interest (region of interest, ROI): A region that is divided from a processed image by using a box, a circle, an ellipse, an irregular polygon, or the like in machine vision and image processing is called a region of interest ROI. In machine vision software such as Halcon, OpenCV, and MATLAB, various operators (Operator) and functions are usually used to obtain the region of interest ROI and perform subsequent image processing.

Intersection over union (Intersection over Union, IOU) is a ratio of an intersection to a union of areas of two rectangles. IOU is a standard for measuring accuracy of detecting a corresponding object in a specific data set. IOU is a simple measurement standard. Any task that obtains a prediction range (bounding boxes) in an output can be measured by IOU.

An advanced driver assistance system (Advanced Driver Assistance System, ADAS) is an active safety technology that uses various sensors mounted on a vehicle to collect environment data inside and outside the vehicle in a timely manner, and performs technical processing, such as recognition, detection, and tracking, on static and dynamic objects, so that a driver is enabled to detect a potential risk as soon as possible. This attracts attention and improves safety. Sensors used in the ADAS mainly include a camera, a radar, a laser, ultrasonic waves, and the like, can detect light, heat, pressure, or another variable that is used to monitor vehicle status, and are usually located in a front bumper and a rear bumper, side-view mirrors, or a steering handle of a vehicle, or on a windshield of the vehicle. An early ADAS technology mainly gives an alarm passively. When it is detected that a vehicle has a potential danger, an alarm is given to remind a driver to note an abnormal vehicle or road condition. Active intervention is also common for the latest ADAS technology.

An adaptive cruise control (Adaptive Cruise Control, ACC) system is developed based on a cruise control system. In addition to a function of the cruise control system, namely, a function of driving at a speed set by a driver, a function of keeping a preset following distance and a function of automatically accelerating and decelerating based on a change of the following distance may also be implemented. Compared with the cruise control system, the ACC system can better help a driver coordinate a brake and a throttle.

A road side unit (Road Side Unit, RSU) is an apparatus that is mounted on a road side in an electronic toll collection (Electronic Toll Collection, ETC) system and that uses dedicated short range communications (Dedicated Short Range Communications, DSRC) to communicate with an on-board unit (On-Board Unit, OBU) to implement vehicle identification and electronic score deduction. The RSU may include a high-gain directional beam control readable/writable antenna and a radio frequency controller. The high-gain directional beam control readable/writable antenna is a microwave transceiver module that is responsible for transmitting/receiving, modulating/demodulating, encoding/decoding, and encrypting/decrypting a signal and data. The radio frequency controller is a module that controls data transmission and reception and receives information from an upper computer or sends information to the upper computer.

The intelligent light switching method provided in this application is performed by an intelligent light switching system. To facilitate understanding of embodiments of this application, an application scenario of the intelligent light switching system on which embodiments of this application are based is described first. FIG. 1 is a schematic diagram of an application scenario of an intelligent light switching system. The scenario shown in FIG. 1 is a scenario in the Internet of Vehicles. The scenario includes a plurality of intelligent vehicles, a radio transmitting tower, and an RSU. The intelligent light switching system may be used in an on-board system of the intelligent vehicle, for example, used in an ADAS system or an ACC system, and may intelligently switch to a high beam or a low beam in a plurality of scenarios such as driver assistance and autonomous driving. In addition, the intelligent light switching system may alternatively be mounted in the intelligent vehicle as an independent system, to be separate from other driver assistance systems in the intelligent vehicle.

Figure 2:
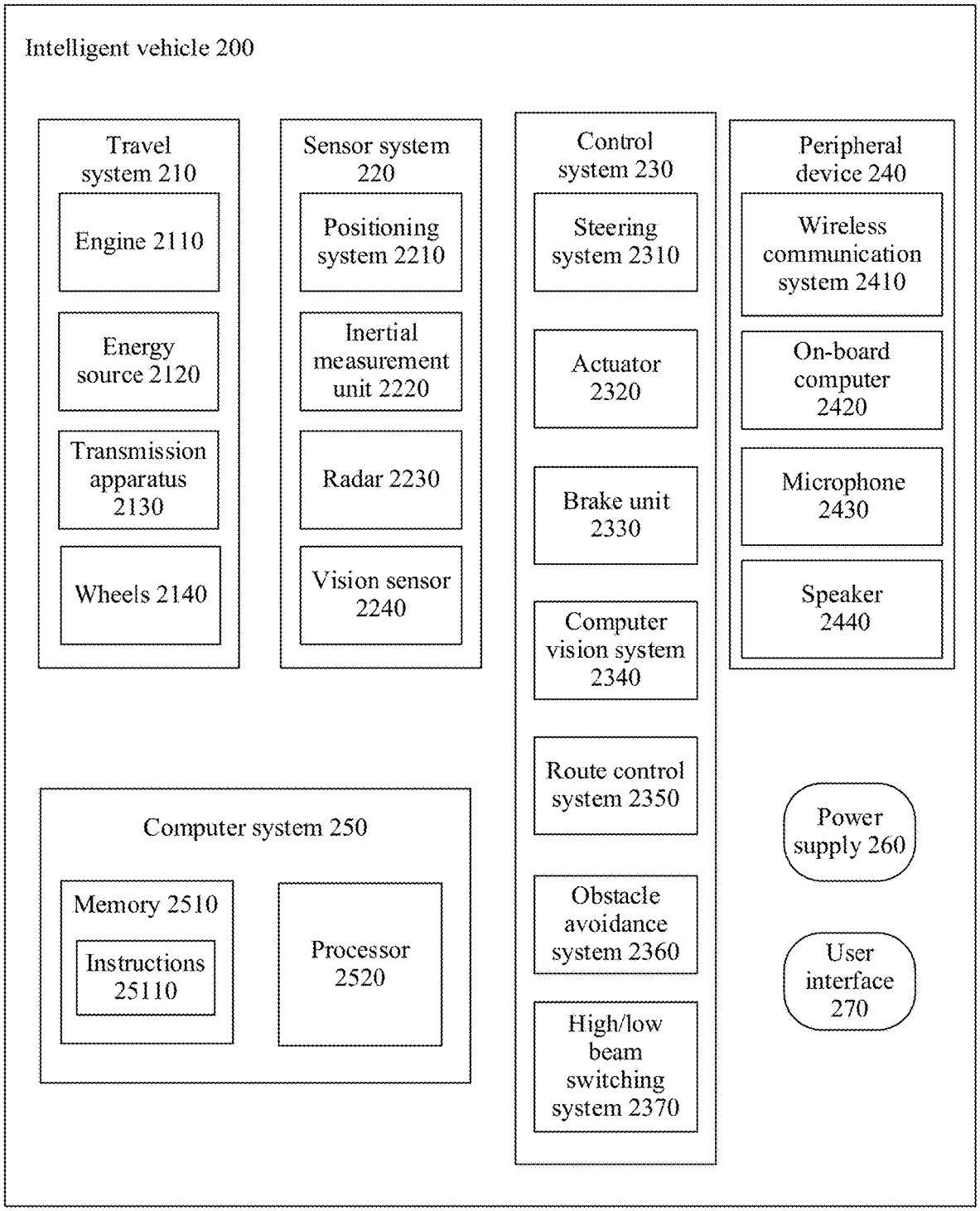
FIG. 2 is a schematic diagram of a structure of an intelligent vehicle according to an embodiment of this application.

Based on the application scenario of the intelligent light switching system, an embodiment of this application provides an intelligent vehicle 200 used in the application scenario of the foregoing intelligent light switching system. FIG. 2 is a schematic diagram of a structure of an intelligent vehicle 200 according to an embodiment of this application.

It should be noted that the intelligent vehicle 200 may be set to a fully intelligent driving mode, or may be set to a partially intelligent driving mode. It may be understood that when the intelligent vehicle 200 is set to the fully intelligent driving mode, the intelligent vehicle 200 may perform a corresponding operation without interacting with a person. The operation includes but is not limited to acceleration, deceleration, and car following. When the intelligent vehicle is set to the partially intelligent driving mode, a corresponding operation may be not only automatically performed by the intelligent vehicle 200, but also performed by a driver. For example, the corresponding operation is determining a vehicle and a surrounding environment, determining a possible behavior of at least one another vehicle in the surrounding environment, determining a confidence level corresponding to a possibility that the another vehicle performs the possible behavior, and controlling the intelligent vehicle 200 based on determined information.

The intelligent vehicle 200 may include various subsystems, such as a travel system 210, a sensor system 220, a control system 230, one or more peripheral devices 240, one or more computer systems 250, a power supply 260, and a user interface 270. Optionally, the intelligent vehicle 200 may include more or fewer subsystems, and each subsystem may include a plurality of elements. In addition, the subsystems and elements of the intelligent vehicle 200 may be interconnected in a plurality of manners, for example, in a wired or wireless manner.

The travel system 210 may include a component that provides power for the intelligent vehicle 200. In an embodiment, the travel system 210 may include an engine 2110, an energy source 2120, a transmission apparatus 2130, and wheels/tyres 2140. The engine 2110 may be an internal combustion engine, a motor, an air compression engine, or another type of an engine combination, for example, a hybrid engine composed of a gasoline engine and a motor, or a hybrid engine composed of an internal combustion engine and an air compression engine. The engine 2110 converts the energy source 2120 into mechanical energy.

Examples of the energy source 2120 include gasoline, diesel, another petroleum-based fuel, propane, another compressed gas-based fuel, ethanol, a solar panel, a battery, and another source of power. The energy source 2120 may also provide energy for another system of the intelligent vehicle 200.

The transmission apparatus 2130 may transmit mechanical power from the engine 2110 to the wheels 2140. The transmission apparatus 2130 may include a gearbox, a differential, and a drive shaft. In an embodiment, the transmission apparatus 2130 may further include another component, for example, a clutch. The drive shaft may include one or more shafts that may be coupled to one or more of the wheels 2140.

The sensor system 220 may include several sensors that sense surrounding environment information of the intelligent vehicle 200 and obtain vehicle information of the intelligent vehicle 200. For example, the sensor system 220 may include a positioning system 2210, an inertial measurement unit (inertial measurement unit, IMU) 2220, a radar 2230, and a vision sensor 2240. The positioning system 2210 may include a GPS system, a BeiDou system, or another positioning system. The sensor system 220 may further include sensors of an internal system of a monitored intelligent vehicle 200, such as an in-vehicle air quality monitor, a fuel gauge, and an oil temperature gauge. Data obtained by these sensors may be used to detect an object and corresponding features thereof. The features include but are not limited to a position, a shape, a direction, and a speed. Such detection and recognition have great significance for the intelligent vehicle 200 to safely perform a subsequent operation.

The positioning system 2210 may be configured to determine a geographical location of the intelligent vehicle 200.

The IMU 2220 may sense a location change and an orientation change of the intelligent vehicle 200 based on inertial acceleration. In an embodiment, the IMU 2220 may be a combination of an accelerometer and a gyroscope. In this case, the IMU 2220 may be configured to measure a curvature of the intelligent vehicle 200.

The radar 2230 may sense a surrounding environment of the intelligent vehicle 200 by using a wireless signal. The surrounding environment includes but is not limited to a surrounding vehicle, infrastructure, and a pedestrian. It may be understood that the radar 2230 may include but is not limited to a millimeter-wave radar and a lidar. In some embodiments, in addition to sensing the surrounding environment, the radar 2230 may be further configured to sense motion status of an object in the environment.

The vision sensor 2240 may be configured to capture a plurality of images of the ambient environment of the intelligent vehicle 200. The vision sensor 2240 may include but is not limited to a static camera and a video camera.

The control system 230 may be configured to control operations of the intelligent vehicle 200 and components of the intelligent vehicle. The control system 230 may include a plurality of elements. In an embodiment, the control system 230 includes a steering system 2310, an actuator 2320, a brake unit 2330, a computer vision system 2340, a route control system 2350, an obstacle avoidance system 2360, and a high/low beam switching system 2370.

The steering system 2310 may adjust an advancing direction of the intelligent vehicle 200 via an operation. For example, in an embodiment, the steering system 2310 may include a steering wheel system.

The actuator 2320 may be configured to control the engine 2110, thereby controlling a speed of the intelligent vehicle 200. For example, in an embodiment, the actuator 2320 may include a throttle.

The brake unit 2330 may be configured to control the intelligent vehicle 200 to decelerate. The brake unit 2330 may use friction to reduce a rotation speed of the wheel 2140. In another embodiment, the brake unit 2330 may convert kinetic energy of the wheel 2140 into a current. The brake unit 2330 may also use another method to reduce the rotation speed of the wheel 2140, thereby controlling the speed of the intelligent vehicle 200.

It may be understood that the actuator 2320 and the brake unit 2330 may be combined into one unit module. The combined unit module may be configured to control the speed of the intelligent vehicle 200. In an embodiment, the combined unit module may include a throttle system and a brake system.

The computer vision system 2340 may be configured to process and analyze an image captured by the vision sensor 2240, to facilitate a subsequent operation. The computer vision system 2340 can further recognize a surrounding environment of the intelligent vehicle 200, a feature of an object in the surrounding environment, and motion status of the object. The surrounding environment may include a traffic light, a road boundary, and an obstacle. Features of an object in the surrounding environment include but are not limited to a surface optical feature of a surface of the object. The motion status includes but is not limited to being static, accelerating, or decelerating. The computer vision system 2340 may use a color space conversion technology, an object recognition algorithm, a structure from motion (Structure from Motion, SFM) algorithm, video tracking, and another computer vision technology. In some embodiments, the computer vision system 2340 includes an image detection system, a neural network-Based processing system, and the like, and may be configured to draw a map for an environment, track an object, estimate a speed of the object, and the like.

The route control system 2350 is configured to determine a driving route of the intelligent vehicle 200. In some embodiments, the route control system 2350 may determine the driving route for the intelligent vehicle 200 with reference to data of one or more predetermined maps from the positioning system 2210.

The obstacle avoidance system 2360 is configured to recognize, evaluate, avoid, or bypass an obstacle in the surrounding environment. In an embodiment, the obstacle avoidance system 2360 needs to obtain information about the surrounding environment by using the radar 2230 and the vision sensor 2240, and then analyze the surrounding environment by using the computer vision system 2340 to recognize a potential obstacle. Then, the obstacle avoidance system 2360 performs evaluation and avoidance.

The high/low beam switching system 2370 is configured to intelligently switch to a high beam or a low beam. In an embodiment, the high/low beam switching system 2370 may be enabled automatically based on ambient light, and may automatically switch to the high beam or the low beam; or may be enabled manually.

It should be noted that the control system 230 may further include another component, or those components described above may be replaced and/or reduced.

The intelligent vehicle 200 interacts with an external sensor, another vehicle, another computer system, or a user by using the peripheral device 240. The peripheral device 240 may include but is not limited to a wireless communication system 2410, an on-board computer 2420, a microphone 2430, and/or a speaker 2440.

It should be noted that, in some embodiments, the peripheral device 240 may interact with a user of the intelligent vehicle 200. For example, the on-board computer 2420 may provide information for the user of the intelligent vehicle 200. In addition, the user of the intelligent vehicle 200 may also upload data to the on-board computer 2420. It may be understood that the user of the intelligent vehicle 200 may perform an operation by using a touchscreen of the on-board computer 2420. In addition, the peripheral device 240 may provide a means for the intelligent vehicle 200 to communicate with another device in the vehicle. For example, the microphone 2430 may receive audio from the user of the intelligent vehicle 200, and the audio may include a voice command and another audio input. Similarly, the speaker 2440 may output audio to the user of the intelligent vehicle 200.

The wireless communication system 2410 may wirelessly communicate with one or more devices directly or by using a communication network. For example, the wireless communication system 2410 may use 3G cellular communications such as CDMA, EVDO, or GSM/GPRS, use 4G cellular communications such as LTE, or use 5G cellular communications. The wireless communication system 2410 may communicate with a wireless local area network (wireless local area network, WLAN) by using Wi-Fi. In some embodiments, the wireless communication system 2410 may directly communicate with a device by using an infrared link, Bluetooth, or ZigBee. The device may include but is not limited to a public facility between the vehicle and/or a roadside station.

In addition, in an embodiment of this application, the plurality of intelligent vehicles can communicate with each other by using V2X. Therefore, the wireless communication system 2410 may further include one or more DSRC devices and one or more LTE-V2X devices.

The power supply 260 may supply power to various components of the intelligent vehicle 200. In an embodiment, the power supply 260 may include one or more battery packs. A battery in the battery pack may be a rechargeable lithium-ion battery or lead-acid battery. It may be understood that, in some embodiments, the power supply 260 and the energy source 2120 may be implemented together.

Some or all functions of the intelligent vehicle 200 are controlled by the computer system 250. The computer system 250 may include one or more processors 2520. The processors 2520 execute instructions 25110. The instructions 25110 are stored in a non-transitory computer readable medium, for example, a memory 2510. The computer system 250 may alternatively be a plurality of computing devices that control an individual component or subsystem of the intelligent vehicle 200 in a distributed manner.

The processor 2520 may be any conventional processor, for example, a commercially available CPU. Optionally, the processor may be a dedicated device such as an application-specific integrated circuit (Application-Specific Integrated Circuit, ASIC) or another hardware-based processor. Although FIG. 2 functionally illustrates components such as a processor, a memory, and a computer, persons of ordinary skill in the art should understand that the processor, the computer, or the memory may actually include a plurality of processors, computers, or memories that may or may not be stored in a same physical housing. For example, the memory may be a hard disk drive or another storage medium located in a housing different from that of the computer. Thus, it is understood that a reference to the processor or the computer includes a reference to a set of processors, computers, or memories that may or may not operate in parallel. Different from using a single processor to perform the steps described herein, some components such as a steering component and a deceleration component may include respective processors. The processor performs only computation related to a component-specific function.

In various aspects described herein, the processor may be located far away from the vehicle and wirelessly communicate with the vehicle. In another aspect, some processes described herein are performed on a processor disposed inside the vehicle, while others are performed by a remote processor, including performing steps necessary for single manipulation.

In some embodiments, the memory 2510 may include the instructions 25110 (for example, program logic). The instructions 25110 may be executed by the processor 2520, to implement various functions, including the foregoing functions, of the intelligent vehicle 200. The memory 2510 may also include additional instructions, including instructions used to send data to, receive data from, interact with, and/or control one or more of the travel system 210, the sensor system 220, the control system 230, and the peripheral device 240.

In addition to storing the instructions 25110, the memory 2510 may further store data, such as a road map, route information, vehicle data such as a location, a direction, and a speed of the vehicle, and other related information. It may be understood that, in an embodiment, when the intelligent vehicle 200 is in an autonomous, semi-autonomous, and/or manual mode, the computer system 250 of the intelligent vehicle 200 can perform a related operation by using the data. For example, a current speed of the intelligent vehicle may be adjusted based on road information of a target road section and a received target vehicle speed range, so that the intelligent vehicle can travel at a constant speed while following another vehicle.

The user interface 270 is configured to provide information for or receive information from the user of the intelligent vehicle 200. Optionally, the user interface 270 may include an interface required by one or more input/output devices in the peripheral device 240, for example, a USB interface, an AUX interface, or an OBD interface.

The computer system 250 may control functions of the intelligent vehicle 200 based on data of various subsystems (for example, the travel system 210, the sensor system 220, and the control system 230) and data received from the user interface 270. For example, the computer system 250 may control the steering system 2310 to avoid an obstacle that is detected by the sensor system 220 and the obstacle avoidance system 2360.

Optionally, the foregoing components may be mounted inside the intelligent vehicle 200 as subsystems. Alternatively, one or more of the components may be mounted separately from the intelligent vehicle 200. For example, the memory 2510 may be partially or completely separate from the intelligent vehicle 200. The foregoing components may be coupled in a wired and/or wireless manner.

It should be noted that the foregoing modules and components in the modules may be added, replaced, or deleted based on an actual requirement. This is not limited in this application.

An intelligent driving vehicle, for example, the intelligent vehicle 200 in FIG. 2, that travels on a road may recognize a surrounding environment to adjust a current speed. The surrounding environment may include but is not limited to another vehicle, a pedestrian, a traffic control device, another infrastructure, and another type of an object. In some embodiments, the intelligent driving vehicle may independently consider each recognized object, and determine, based on a feature of the object, for example, a speed, acceleration, or a relative distance from the vehicle, a speed to which an autonomous vehicle needs to be adjusted.

Optionally, the intelligent vehicle 200 or a computing device (such as the computer system 250, the computer vision system 2340, and the data storage apparatus 2510 in FIG. 2) associated with the intelligent vehicle 200 may predict behavior of a recognized object based on a feature of the recognized object and status (for example, traffic, rain, and ice on a road) of a surrounding environment. It may be understood that all recognized objects are associated. Therefore, behavior of a single object may be further predicted by analyzing statuses of all other objects in the surrounding environment. The intelligent vehicle 200 can adjust a speed of the intelligent vehicle 200 based on the predicted behavior of the recognized object. In other words, the intelligent vehicle 200 can determine, based on the predicted behavior of the object, how the vehicle needs to be adjusted (for example, accelerated, decelerated, or stopped) and a stable state to which the vehicle needs to be adjusted. In this process, impact of another factor may also be considered, for example, a horizontal position in a road on which the intelligent vehicle 200 travels, a curvature of the road, and proximity of a static object and a dynamic obj ect.

In addition to an instruction for adjusting a speed of the intelligent vehicle 200, the computing device may further provide an instruction for modifying a steering angle of the intelligent vehicle 200, so that the autonomous vehicle follows a given track and/or keeps a safe horizontal distance and a safe vertical distance from an object (for example, a car in an adjacent lane) near the autonomous vehicle.

The intelligent vehicle 200 may be a car, a truck, a motorcycle, a bus, a boat, an entertainment vehicle, a vehicle in an amusement park, a construction device, a tram, a train, or the like. This is not limited in this embodiment of this application.

It may be understood that the schematic diagram of the structure of the intelligent vehicle shown in FIG. 2 is merely an example implementation in this embodiment of this application. The intelligent vehicle in this embodiment of this application includes but is not limited to the foregoing structure.

Figure 3:
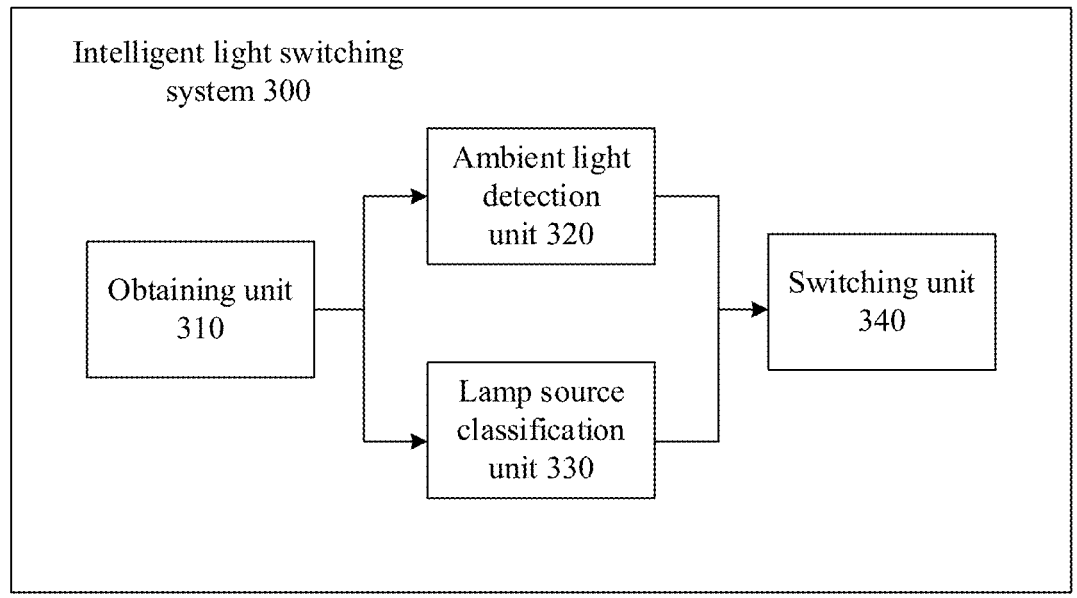
FIG. 3 is a schematic diagram of a structure of an intelligent light switching system according to an embodiment of this application.

This application provides an intelligent light switching system, used for intelligent light switching in a driving process at night. The intelligent light switching system first obtains an image of a scenario in front of the system, then obtains ambient light information, classifies a lamp source in the image, and finally determines, based on the ambient light information and the lamp source classification information, whether to switch to a high/low beam. There may be a plurality of division manners for units in the intelligent light switching system. This is not limited in this application. FIG. 3 is an example division manner. As shown in FIG. 3, the following describes a function of each functional unit.

The intelligent light switching system 300 includes an obtaining unit 310, an ambient light detection unit 320, a lamp source classification unit 330, and a switching unit 340. The obtaining unit 310 is configured to obtain an image, where the image is shot by a video camera disposed at a fixed position of a vehicle, and lamp source information is recorded in the image. The ambient light detection unit 320 is configured to calculate an ambient light brightness value corresponding to the image. The lamp source classification unit 330 is configured to classify, based on the lamp source information, a lamp source included in the image to obtain a classification result. The switching unit 340 is configured to switch to a high beam or a low beam based on the ambient light brightness value corresponding to the image and the classification result.

It may be learned from the foregoing content that, lamp source classification is a crucial step in a solution of this application, and is implemented by the lamp source classification unit 330. Specifically, the lamp source classification unit 330 includes a lamp source detection model. The lamp source detection model performs detection on the obtained image and performs lamp source classification.

It may be understood that the lamp source detection model may be an AI model, and an initial AI model needs to be trained before detection is performed by using the AI model. In this application, the initial AI model is trained by using a sample image that includes lamp source information and that is obtained by the video camera, so that the trained AI model has a lamp source classification capability, and can perform lamp source classification on an image obtained by the video camera.

In addition, the lamp source detection model in this application may further determine a position (detection box information/a position of a target in an image) of the lamp source and detect an actual distance between the lamp source and an ego vehicle.

In a training process, special training data needs to be used for training. When analysis is performed based on a model capability requirement, a sample image that is shot by the video camera and that carries annotation information needs to be used for training, where the sample image records the target, and the annotation information includes category information, position information (detection box information/a position of the target in the image), and distance information (a distance between the target and the ego vehicle, and the like) of the target in the sample image.

The category information of the target is used to indicate a category of the target. In this embodiment of this application, the target is a lamp source, for example, a vehicle headlight, a vehicle taillight, a street lamp, or a traffic light. The category information of the target is category information of the lamp source.

In addition, during classification, a detection box needs to be used. The detection box is used to mark a target in a sample image. In this embodiment of this application, the detection box is a lamp box, and the detection box information may include but is not limited to target category information and pixel coordinate information. For example, in an embodiment of this application, a rectangular detection box is used for annotation. The detection box information includes category information and pixel coordinate information that are of an annotated target. The category information includes features such as a shape and a color of the detection box. The pixel coordinate information includes four pixel coordinates, that is, an upper-left horizontal coordinate, an upper-left vertical coordinate, a lower-right horizontal coordinate, and a lower-right vertical coordinate of the detection box.

It should be noted that, in an embodiment of this application, the detection box information may directly display text to indicate the category information of the target, or may indicate the category of the target by using features such as the shape and the color of the detection box. The annotation information may be stored as a file in a form of extensible markup language (extensible markup language, XML), a JavaScript object profile (JavaScript object notation, JSON), or the like.

The lamp source detection model is described below in detail.

In this application, the training data (the sample image) required for training the lamp source detection model is obtained by the video camera at the fixed position in the vehicle. Detection may be performed on the sample image by using a target detection algorithm, so as to obtain the category information and the detection box information that are of the lamp source and that are recorded in the sample image. Alternatively, the foregoing information may be obtained in a manual labeling manner. It may be understood that the sample image may include images obtained at different moments and images having different exposure times.

After the plurality of sample images are obtained and the annotation information of the plurality of sample images is obtained, the plurality of sample images with the annotation information form a training set, and training is performed by using the training samples in the training set. First, an initial lamp source detection model is determined. It may be learned from the above that the initial lamp source detection model in this application may be an AI model, and may specifically be a deep neural network model. The model can not only detect a type of a lamp source and a position of the lamp source in an image, but also calculate an actual distance between the lamp source and an ego vehicle. This means that the initial lamp source detection model in this application is improved structurally.

Figure 4:
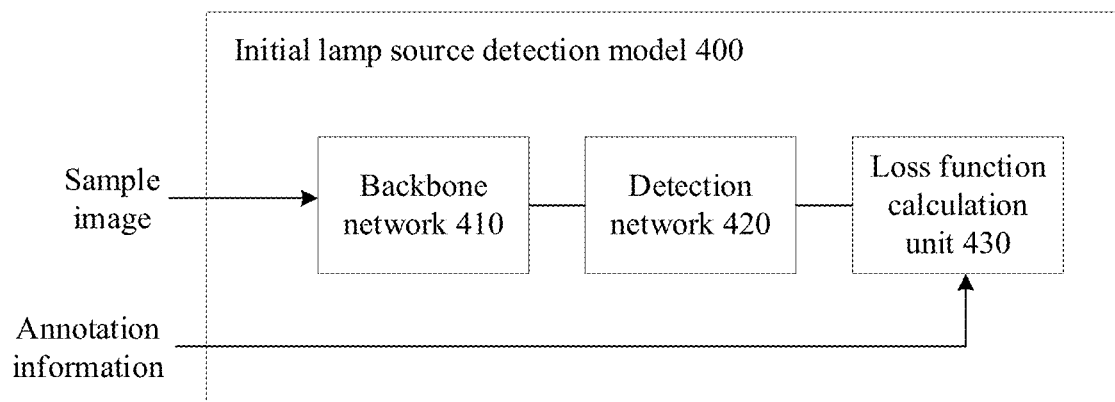
FIG. 4 is a schematic diagram of a structure of an initial lamp source detection model according to an embodiment of this application.

As shown in FIG. 4, a structure of an initial lamp source detection model 400 in this application mainly includes three parts: a backbone network 410, a detection network 420, and a loss function calculation unit 430. The backbone network 410 is configured to extract a feature from an input sample image, and includes several convolutional layers that may be a visual geometry group (visual geometry group, VGG) network, a residual network (residual network), a dense convolutional network (dense convolutional network), or the like. The detection network 420 is configured to: perform detection and recognition on the feature extracted by the backbone network 410, and output lamp source category information and lamp source position information (namely, detection box information). The detection network 420 is also essentially formed by several convolutional layers, and thus further performs convolutional calculation on an output result of the backbone network 410.

As described above, compared with a general detection model (for example, yolo and faster RCNN), the lamp source detection model in this application is different in structure. Because there is a proportional relationship among a distance between vehicle lamps of a same vehicle in an image, a real vehicle width of the vehicle, a focal length of a video camera used for obtaining the image, and a distance between the vehicle and an ego vehicle, if three of the four values are known, the other one can be calculated based on the proportional relationship. Therefore, the backbone network 410 may use networks of a same type. However, in the detection network 420 in this application, a plurality of channels are added to each convolutional layer that is responsible for regressing a detection box. Preferentially, two channels are added to indicate a horizontal coordinate and a vertical coordinate that are of a lamp source and that are in a sample image. The distance between the vehicle lamps of the vehicle in the image may be obtained by using a horizontal coordinate and a vertical coordinate of a lamp source of the same vehicle, so as to obtain the distance between the vehicle and the ego vehicle. Certainly, more channels may be added. Each channel is assigned a corresponding physical meaning. This is not limited in this application.

First, parameters of the initial lamp source detection model 400 are initialized. Then, a sample image is input to the initial lamp source detection model 400. The backbone network 410 extracts a feature of a target recorded in the sample image to obtain an abstract feature, and then inputs the abstract feature to the detection network 420. The detection network performs further detection and recognition, predicts a type and a position that are of the target, and a distance from the target to the ego vehicle, and outputs a prediction result to the loss function calculation unit 430 through a corresponding channel. Then, annotation information corresponding to the sample image is also input to the loss function calculation unit 430. The loss function calculation unit 430 compares the prediction result obtained by the detection network 420 with the annotation information corresponding to the sample image, calculates a loss function, and updates and adjusts a parameter in the model by using the loss function as a target function and by using a backpropagation algorithm. Sample images carrying annotation information are sequentially input; and the foregoing training process is performed continuously and iteratively until a value of the loss function converges, that is, a value of the loss function calculated each time fluctuates around a specific value. In this case, the lamp source classification model has been trained completely, that is, the lamp source classification model has the type and the position that are of the target in the image, and the distance from the target to the ego vehicle, and may be used for lamp source classification.

It should be noted that, in this application, because the two channels are added to each convolutional layer that is responsible for regressing the detection box, a construction of the loss function needs to be redesigned. It is assumed that a target positioning model in this application is improved based on a classic target detection model (for example, yolo or faster RCNN), and a loss function of the classic target detection model is Loss1. In this case, a loss function Loss used for constructing the target positioning model in this application may be represented as: Loss=Loss1+Loss2, where Loss2 is a loss function corresponding to the two newly added channels.

Figure 5:
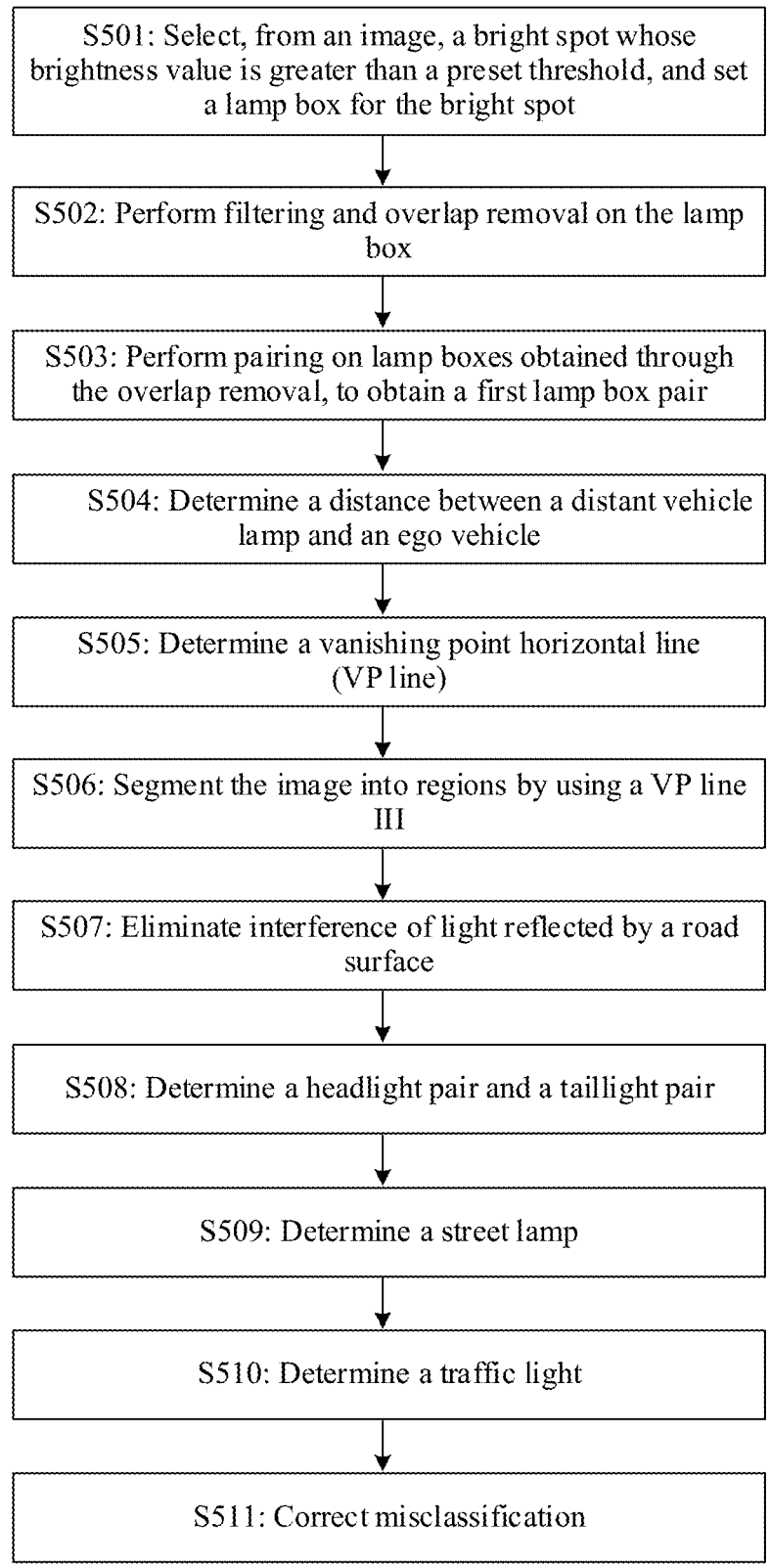
FIG. 5 is a schematic diagram of a method for extracting a lamp source feature from an image according to an embodiment of this application.

As described above, extraction of a feature of a lamp source in an image is mainly implemented by the backbone network 410 and the detection network 420. How to extract a feature for classification is specifically described below with reference to FIG. 5. As shown in FIG. 5, the method includes but is not limited to the following steps.

S501: Select, from an image, a bright spot whose brightness value is greater than a preset threshold, and set a lamp box for the bright spot.

Specifically, a bright spot whose brightness is greater than or equal to the preset threshold is selected from bright spots as a first bright spot; and the lamp box is set for the first bright spot. A size of the lamp box may adaptively change based on a size of the first bright spot that needs to be marked.

Figure 6:
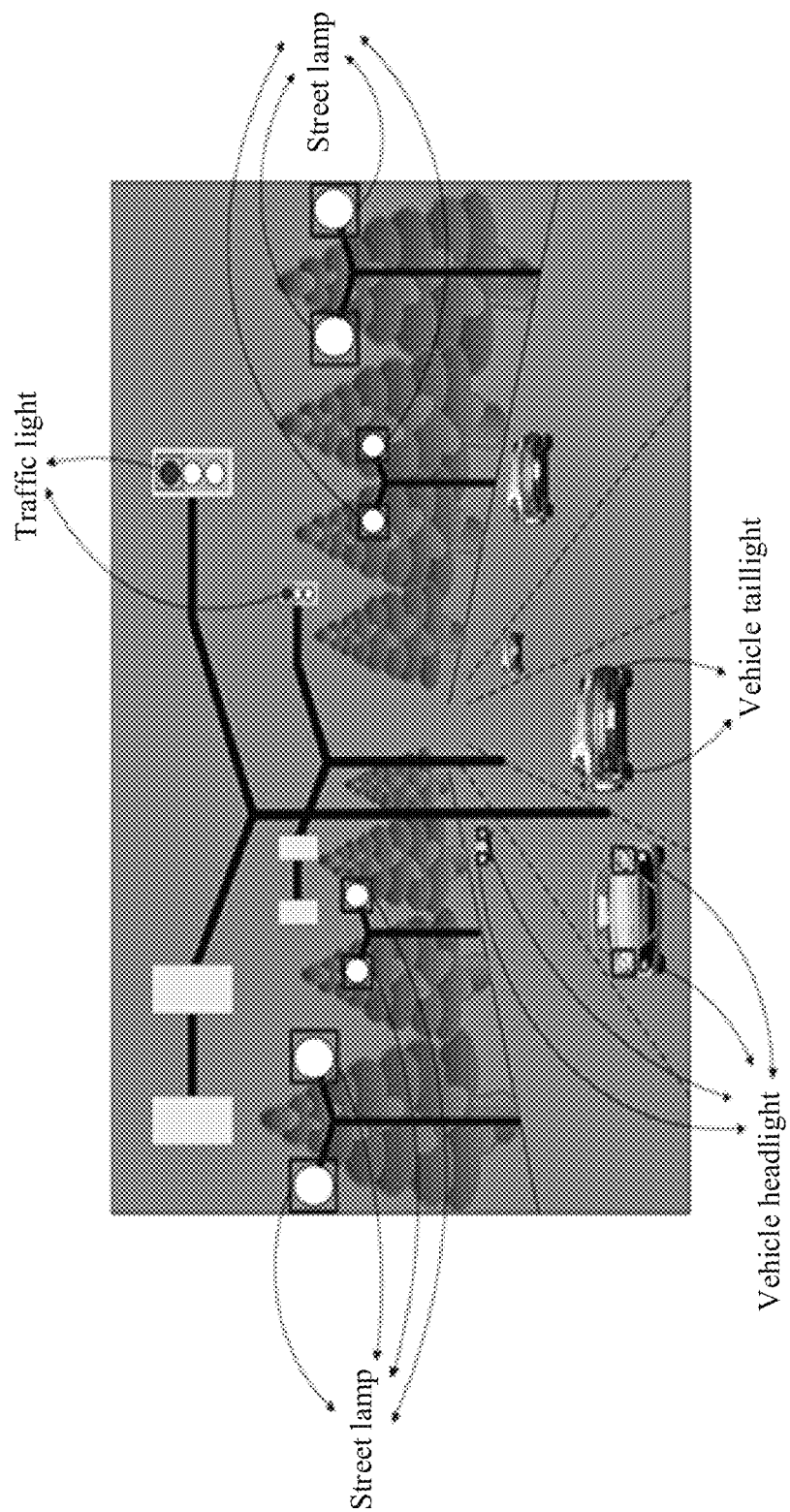
FIG. 6 is a schematic diagram of disposing a lamp box for a first bright spot according to an embodiment of this application.

For example, as shown in FIG. 6 which is a schematic diagram of setting a lamp box for a first bright spot, distribution, on the image, of bright spots having different features can be clearly displayed by recognizing elements such as positions on the image, brightness, sizes, and colors of first bright spots, and by marking, with a red box, a first bright spot located at a lower portion of the image, marking, with blue boxes, first bright spots that are located at an upper portion of the image and that have a specific distribution feature, and marking, with a purple box, a first bright spot that is located at the upper portion of the image and that has a distinct color feature.

The specific distribution feature means that a connection line of a plurality of first bright spots on a left side in an upper region of the image and a connection line of a plurality of first bright spots on a right side in an upper region of the image intersect a specific point in a center of the image within a specific error range.

It should be noted that the foregoing manner of setting a lamp box is merely an example manner in this application. Specific parameters such as a size, a shape, and a color of the lamp box may be set by a research and development person based on an actual requirement and experimental data. For example, during setting of a lamp box, lamp boxes of different colors or different shapes are used to mark bright spots with different features. This is not limited in this application.

S502: Perform filtering and overlap removal on the lamp box.

Figure 7:
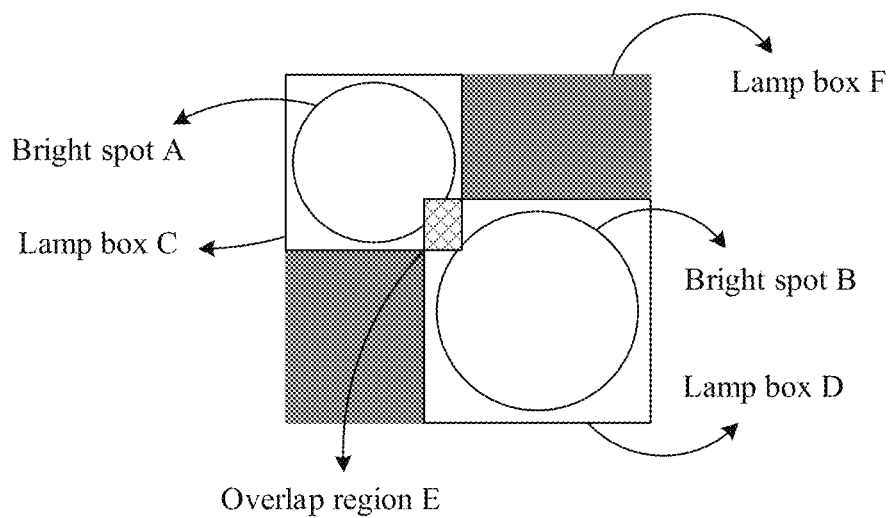
FIG. 7 is a schematic diagram of performing overlap removal on a lamp box according to an embodiment of this application.

After the lamp box is set, there may be an intersection or a tangent between lamp boxes. This may affect a subsequent operation. Therefore, filtering and overlap removal need to be performed on the lamp boxes. It should be noted that there are a plurality of methods for performing filtering and overlap removal on the lamp box. For example, in an embodiment of this application, overlap removal is performed on the lamp box by using an IOU algorithm. As shown in FIG. 7, a bright spot A is marked with a lamp box C, and a bright spot B is marked with a lamp box D. When it is detected that an overlap region E exists between the lamp box C and the lamp box D, a second lamp box is generated. The second lamp box is larger than the original lamp boxes and may include both the two bright spots. A lamp box F in FIG. 7 is the second lamp box. It may be understood that a size of the second lamp box may be determined based on sizes of the original lamp boxes. In other cases, specific parameters, such as a size, a shape, and a color, of the second lamp box may also be preset.

S503: Perform pairing on lamp boxes obtained after the overlap removal, to obtain a first lamp box pair.

In an embodiment of this application, any two lamp boxes in the image can be successfully paired only when at least three conditions are met. A first condition is that an absolute value of a difference between heights of the two lamp boxes is less than a first threshold. A second condition is that a distance between the two lamp boxes has a linear relationship with a lamp box height, that is, a ratio of the distance between the two lamp boxes to the lamp box height is within a ratio interval. A third condition is that an angle between a connection line between central points of the two lamp boxes and a horizontal line is less than a second threshold. It may be understood that in the second condition, the distance between the two lamp boxes is a distance between the central points of the lamp boxes (that is, a length of the connection line between the central points of the two lamp boxes), and the lamp box height is an average value of the heights of the two lamp boxes.

Figure 8:
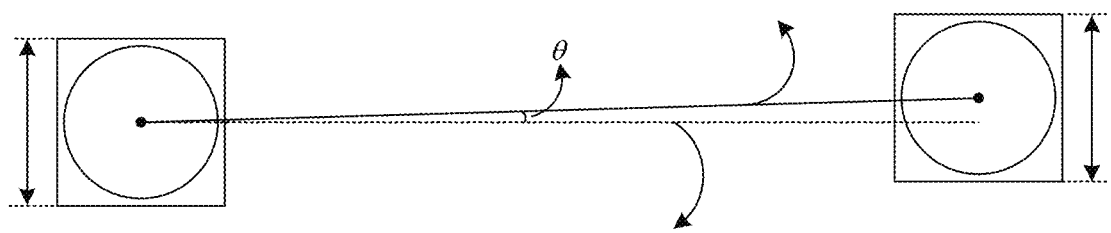
FIG. 8 is a schematic diagram of a lamp box pairing method according to an embodiment of this application.

FIG. 8 is a schematic diagram of lamp box pairing. In the figure, a lamp box A and a lamp box B are any two lamp boxes selected from the image, a height of the lamp box A is a, a height of the lamp box B is b, and a distance between central points of the lamp boxes is c.

When |a−b| is less than the first threshold, $$\frac{c}{(a+b) \div 2}$$

is within the ratio interval, and when θ is less than the second threshold, the lamp box A and the lamp box B are successfully paired, that is, it may be considered that a bright spot in the lamp box A and a bright spot in the lamp box B are a pair of lamps.

It may be understood that the first threshold, the second threshold, and the ratio interval are set by the research and development person based on an actual requirement and experimental data. This is not limited in this application.

S504: Determine a distance between a distant vehicle lamp and an ego vehicle.

It may be learned from the above that a central region is a region in which a vehicle lamp of a distant vehicle may appear. A first lamp box pair in the central region is selected. A ratio of a distance between central points of first bright spots in the first lamp box pair to a real vehicle width is a first ratio. A ratio of a focal length of a video camera used for obtaining the image to a distance from a vehicle to which the first lamp box pair belongs to the ego vehicle is a second ratio. It may be understood that the first ratio is equal to the second ratio within a specific error range. In an embodiment of this application, it may be considered that the two ratios are approximately equal to each other. Therefore, the distance from the vehicle to which the first lamp box pair belongs to the ego vehicle can be obtained if the distance between the central points of the first bright spots in the first lamp box pair, the real vehicle width, and the focal length of the video camera are known. Alternatively, a value is introduced as an error value. In a case that the distance between the central points of the first bright spots in the first lamp box pair and the real vehicle width are known, the first ratio can be calculated. The error value is added to or subtracted from the first ratio, to obtain the second ratio. Because the focal length of the video camera is known, the distance from the vehicle to which the first lamp box pair belongs to the ego vehicle can be obtained.

It should be noted that the foregoing method is merely an example method in this application, and there may be different methods for determining the distance between the distant vehicle lamp and the ego vehicle. This is not limited in this application.

It may be understood that specific parameters such as a shape and a size of the central region may be preset by the research and development person based on experimental data. This is not limited in this application.

In addition, in another embodiment of this application, to obtain a more accurate lamp source classification result, distances between all vehicles in the obtained image and the ego vehicle may be calculated according to the foregoing method. In this way, not only information about lamp sources but also distance information of the lamp sources can be obtained; and switching can be performed more accurately with reference to illumination distances of a high beam and a low beam.

S505: Determine a vanishing point horizontal line (VP line).

In an embodiment of this application, the obtained image is divided into N rows (N is a positive integer); a row in which the central points of the two first bright spots in the first lamp box pair are located is determined; a quantity of first lamp box pairs in each row of the obtained image is counted; and an in-row quantity distribution map is drawn by using in-row quantities as horizontal coordinates and using the quantities of first lamp box pairs as vertical coordinates. The in-row quantity distribution map may be in a form of a smooth scatter chart, a line scatter chart, a histogram, or the like. When the in-row quantity distribution map is a smooth scatter chart, a trough with a greatest horizontal coordinate in all troughs of the in-row quantity distribution map is selected, and an in-row quantity corresponding to the trough is used as a first-row quantity; or a central position in a lowest interval on a left half side of a peak with a greatest horizontal coordinate in all peaks of the in-row quantity distribution map is selected, and an in-row quantity corresponding to the position is used as a second-row quantity.

Figure 9:
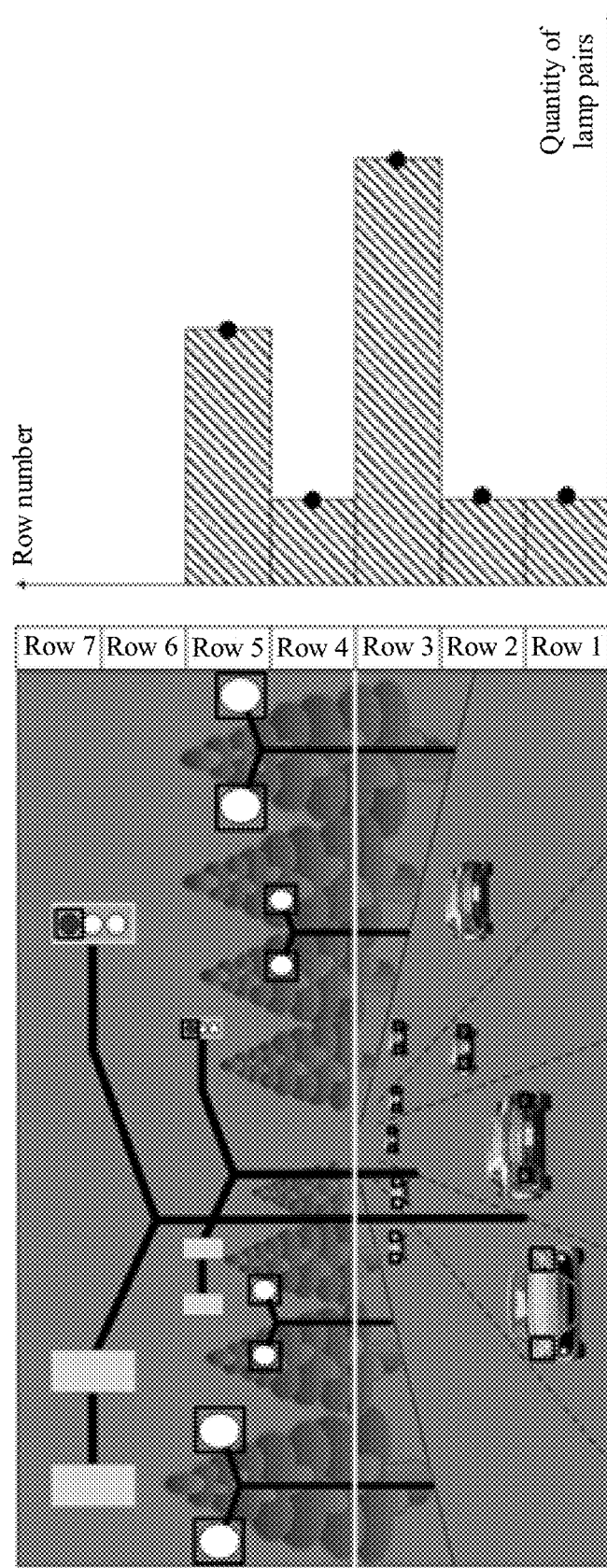
FIG. 9 is a schematic diagram of drawing an in-row quantity distribution map according to an embodiment of this application.

FIG. 9 is a schematic diagram of drawing an in-row quantity distribution map. The obtained image is divided into seven rows. If a width of the image is 280 px (pixels), a height of each row is 40 px. A row in which central points of first bright spots in each first lamp box pair are located is determined, and a quantity of first lamp box pairs in each row of the obtained image is counted. In FIG. 9, quantities of lamp pairs in a row 1, a row 2, and a row 4 are 1, a quantity of lamp pairs in a row 3 is 5, a quantity of lamp pairs in a row 5 is 3, and quantities of lamp pairs in rows 6 and 7 are 0. The in-row quantity distribution map is drawn by using in-row quantities as horizontal coordinates and using the quantities of first lamp box pairs as vertical coordinates. The in-row quantity distribution map is a histogram.

Figure 10:
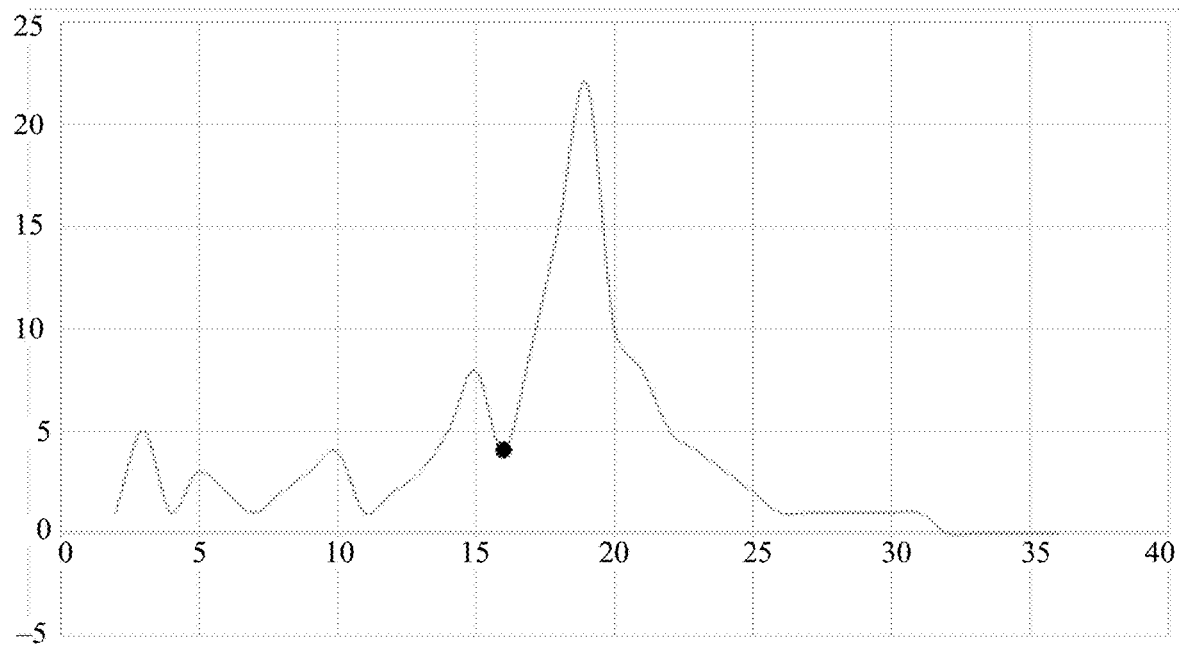
FIG. 10 is a schematic diagram of determining a first-row quantity according to an embodiment of this application.

FIG. 10 is a schematic diagram of determining a first-row quantity. A position marked with a dark spot is a trough with a greatest horizontal coordinate in an in-row quantity distribution map, that is, an in-row quantity corresponding to the position marked with the dark spot is the first-row quantity. It may be understood that a manner of determining a second-row quantity is the same as the manner of determining the first-row quantity. Details are not described herein again.

It should be noted that, if central points of two first bright spots in the first lamp box pair are in different rows, during subsequent counting of a quantity of first lamp box pairs in each row of an image, 0.5 is added to each of the rows in which the central points of the two first bright spots are located. It may be understood that the foregoing process may alternatively be performed according to a different statistical method. For example, 1 is added to each of the rows in which the central points of the two first bright spots are located, or 1 is added to any one of the rows in which the central points of the two first bright spots are located. This is not limited in this application.

In another embodiment of this application, there is also a different method for drawing an in-row quantity distribution map, which may be: first, determining a row in which a central point of a first bright spot that is in the image and that is marked with a lamp box is located; counting a quantity of first bright spots in each row in the image; and drawing an in-row quantity distribution map by using in-row quantities as horizontal coordinates and using the quantities of first bright spots as vertical coordinates.

When the in-row quantity distribution map includes no peak and/or no trough, a default vanishing point horizontal line is selected as a first vanishing point horizontal line (VP line I). When an absolute value of a difference between the first-row quantity and the default vanishing point horizontal line is greater than a third threshold, or when an absolute value of a difference between the second-row quantity and the default vanishing point horizontal line is greater than a third threshold, the default vanishing point horizontal line is selected as the first vanishing point horizontal line (VP line I). Because a vehicle lamp is generally located at a middle position of a vehicle body, the VP line I needs to be corrected based on a preset correction value, that is, the correction value is added to the vanishing point horizontal line, to obtain a second vanishing point horizontal line (VP line II). In addition, a pitch angle of a video camera changes when an ego vehicle brakes, accelerates, travels uphills, and travels downhills, and consequently, a position of a lamp source in the image changes greatly. For this reason, a reference value is introduced. A third vanishing point horizontal line (VP line III) is obtained by multiplying an absolute value of a difference between the VP Line I and the reference value by a damping coefficient a and then adding the reference value. In this case, the obtained VP Line III is a VP Line that can be used to classify the bright spot.

It may be understood that the correction value is a relatively small positive integer. A specific value of the correction value is set by the research and development person based on experimental data and an actual requirement. This is not limited in this application.

It may be understood that the third threshold is set by the research and development person based on an actual requirement and experimental data. This is not limited in this application.

It should be noted that, in another embodiment of this application, values of the reference value and the damping coefficient may be adaptively adjusted based on a specific driving environment, for example, braking, accelerating, traveling uphills, or traveling downhills.

In addition, the foregoing method for introducing the reference value and the damping coefficient is merely an example method in this application. In a specific implementation process, the method may be adjusted or changed based on an actual requirement, to obtain a better beneficial effect. This is not limited in this application.

S506: Segment the image into regions by using a VP line III.

After the VP line III is obtained, the obtained image is divided into a first region and a second region by using, as a dividing line, a row that corresponds to the in-row quantity of the VP line III and that is in the obtained image. The first region is an image region above the dividing line, and the second region is an image region below the dividing line.

S507: Eliminate interference of light reflected by a road surface.

Because a distance between a lamp source in the first region and the road surface is relatively large, reflected light generated between the lamp source and the road surface is relatively dark, and it is most likely that the condition "the brightness is greater than or equal to the preset threshold" is not met. However, because a distance between a lamp source in the second region and the road surface is relatively small, it is most likely that the condition "the brightness is greater than or equal to the preset threshold" is met. Therefore, elimination is mainly performed on light emitted by a first bright spot in the second region and reflected by the road surface.

A first bright spot in the second region is selected. Position analysis is separately performed on the first bright spot, to detect whether there is another first bright spot in a region that is vertically below the first bright spot and whose left-right offset is less than or equal to a preset distance. If there is another first bright spot exists in the region, the another first bright spot is filtered out, to obtain a second bright spot and a second lamp box pair. It may be understood that a first lamp box pair left after the filtering operation is the second lamp box pair. In addition, the preset distance is set by the research and development person based on an actual requirement and experimental data. This is not limited in this application.

Figure 11:
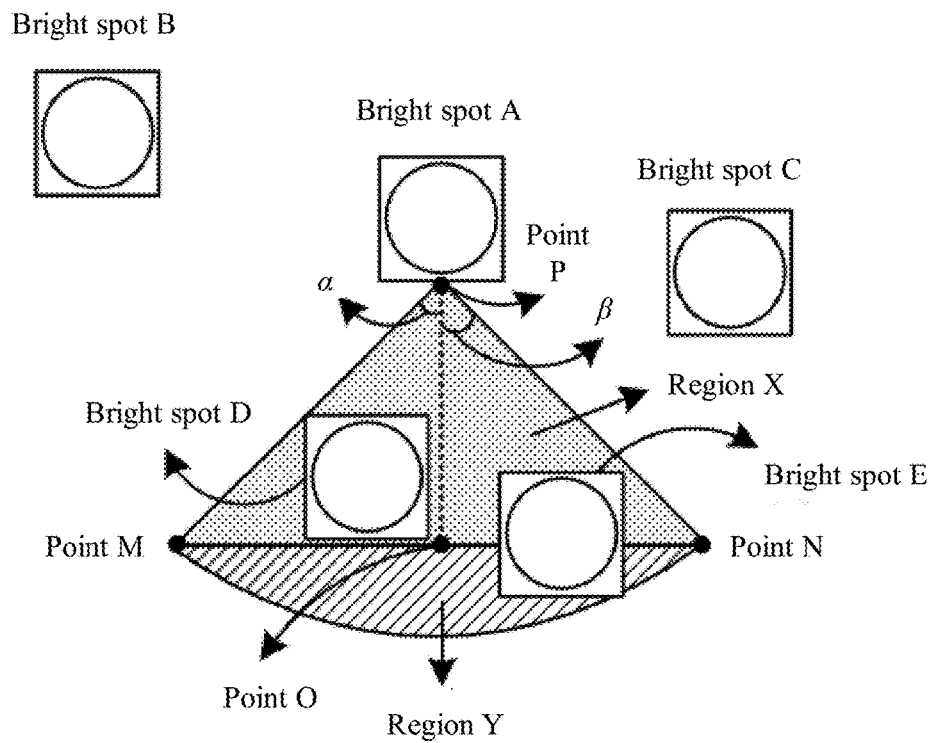
FIG. 11 is a schematic diagram of eliminating interference of light reflected by a road surface according to an embodiment of this application.

FIG. 11 is a schematic diagram of eliminating interference of light reflected by a road surface. In the figure, position analysis is performed on the bright spot A, where a preset distance between a left offset and a right offset is a distance from a point M to a point O (or a distance from a point N to a point O). It may be understood that the distance from the point M to the point O is equal to the distance from the point N to the point O. There are two solutions for eliminating interference of light reflected by the road surface. A first solution is detecting whether there is another first bright spot in a region X. A second solution is detecting whether there is another first bright spot in a sector region composed of the region X and a region Y. The sector region is a region drawn by using a point P as a circle center and using a distance from the point P to the point M as a radius. An angle of the sector region is $(\alpha+\beta)$. It may be understood that $\alpha=\beta$. If the first solution is used, because a bright spot D is in the region X, the bright spot D is filtered out. If the second solution is used, because a bright spot E is in the sector region, the bright spot E is filtered out.

S508: Determine a headlight pair and a taillight pair.

Brightness detection is performed on the second bright spot in the second lamp box pair in the second region; and color analysis is performed on a halo of the second bright spot in the second lamp box pair in the second region. When brightness of the second bright spot is in a first interval, and a color of the halo is in a second interval, the second lamp box pair is a headlight pair. When the brightness of the second bright spot is in a third interval, and the color of the halo is in a fourth interval, the second lamp box pair is a taillight pair.

It should be noted that, if an image obtained in an RGB color space is converted into an image in a YUV color space, a component V (red component) or a component U (blue component) is mainly considered during color analysis. Therefore, when brightness detection is performed on the second bright spot, a value (a brightness value) of the component Y of each pixel of the second bright spot is obtained, so as to obtain an average brightness value of the second bright spot. When color analysis is performed on the second bright spot, a value of the component V of each pixel of the second bright spot is obtained, so as to obtain an average value of the component V of the second bright spot. When the average brightness value is in the third interval, and the average value of the component V is in the fourth interval, the second lamp box pair is the taillight pair. Certainly, color differentiation may alternatively be performed by calculating the average value of the component U. This is not limited in this application.

It may be understood that, for images in different color spaces, methods for performing brightness detection and color analysis may be different. The foregoing content is merely an example method in this application, and is not considered as a limitation to this application.

It should be noted that it can be determined, only when both of two bright spots in the second lamp box pair meet the foregoing condition, that the second lamp box pair is the headlight pair or the taillight pair. In an embodiment of this application, an error value is introduced. When brightness information and color information of the two bright spots in the second lamp box pair meet the foregoing condition within a range of the error value, it may also be considered that the second lamp box pair is the headlight pair or the taillight pair. It may be understood that a specific value of the error value may be set by the research and development person based on an actual requirement and experimental data. This is not limited in this application.

It may be understood that the first interval, the second interval, the third interval, and the fourth interval are set by the research and development person based on an actual requirement and experimental data. This is not limited in this application.

Brightness detection is performed on a second bright spot in the first region; and color analysis is performed on a halo of the second bright spot in the first region. When brightness of the second bright spot is within a fifth interval, and a color of the halo is within a sixth interval, the second bright spot is a street lamp.

S509: Determine a street lamp.

A method for determining a street lamp is the same as the method for determining a headlight pair and a taillight pair. Details are not described herein again. Refer to the foregoing related content for determining a headlight pair and a taillight pair.

It should be noted that the fifth interval and the sixth interval are set by the research and development person based on an actual requirement and experimental data. This is not limited in this application.

S510: Determine a traffic light.

A bright spot that is in the first region and whose brightness is greater than or equal to a fourth threshold is selected as a third bright spot. Brightness detection is performed on the third bright spot in the first region. Color analysis is performed on a halo of the third bright spot in the first region. When brightness of the third bright spot is in a seventh interval, and a color of the halo is in an eighth interval, the third bright spot is the red light in the traffic light. When the brightness of the third bright spot is in a ninth interval, and the color of the halo is in a tenth interval, the third bright spot is the green light in the traffic light. When the brightness of the third bright spot is in an eleventh interval, and the color of the halo is in a twelfth interval, the third bright spot is the yellow light in the traffic light.

A method for determining a traffic light is the same as the method for determining a headlight pair and a taillight pair. Details are not described herein again. Refer to the foregoing related content for determining a headlight pair and a taillight pair.

It may be understood that the seventh interval, the eighth interval, the ninth interval, the tenth interval, the eleventh interval, and the twelfth interval are set by the research and development person based on an actual requirement and experimental data. This is not limited in this application.

It may be understood that the fourth threshold is set by the research and development person based on an actual requirement and experimental data. This is not limited in this application.

S511: Correct misclassification.

The misclassification may occur in a lamp source classification process. For example, because there are two lights on each of the upper and lower sides in the front and rear of a large vehicle such as a bus or a truck, the following situation may occur: Two lights are in the first region and two lights are in the second region. This needs to be corrected.

Vertical analysis is performed on the second lamp box pair in the second region, to find a lamp box pair that is vertically above the second lamp box pair and whose distance from the second lamp box pair is within a thirteenth interval. When brightness of the lamp box pair is within a fourteenth interval, and a color of a halo of the lamp box pair is within a fifteenth interval, the lamp box pair is a headlight of a large vehicle. When the brightness of the lamp box pair is within a sixteenth interval, and the color of the halo is within a seventeenth interval, the lamp box pair is a taillight of the large vehicle.

It may be understood that the thirteenth interval, the fourteenth interval, the fifteenth interval, the sixteenth interval, and the seventeenth interval are set by the research and development person based on an actual requirement and experimental data. This is not limited in this application.

The foregoing process of performing brightness detection and color analysis is the same as the method for determining a headlight pair and a taillight pair. Details are not described herein again. Refer to the foregoing related content for determining a headlight pair and a taillight pair.

It should be noted that, S504 (determining a distance between a distant vehicle lamp and an ego vehicle) may be performed after S507 (eliminating interference of light reflected by a road surface), or may be performed after S508 (determining a headlight pair and a taillight pair), S509 (determining a street lamp), S510 (determining a traffic light), or S511 (correcting misclassification).

In addition, in an embodiment of this application, the following operations are performed on an obtained original image: selecting a central region of the image as an ROI region; and compressing the image. The central region is a region in which a headlight of a distant vehicle may appear. Specific parameters such as a shape and a size of the central region may be preset by the research and development person based on experimental data. Performing a subsequent operation (for example, calculating a brightness weighted value) after the image is compressed may reduce a calculation amount, but some details in the image may be lost. Therefore, lamp source classification is performed based on a combination of the compressed image and a selected central region image of the original image. Specifically, the compressed image is compared with the selected central region image of the original image, lamp sources in the central region are classified based on the central region image, and lamp sources in other regions are classified based on the compressed image.

Figure 12:
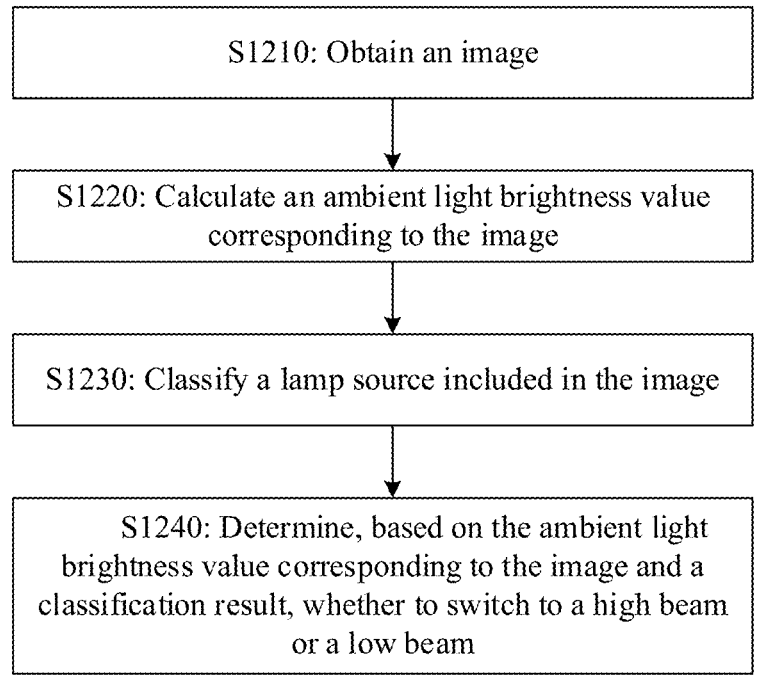
FIG. 12 is a schematic diagram of an intelligent light switching method according to an embodiment of this application.

The foregoing content describes the lamp source classification model and a training process thereof. The following specifically describes a process of the intelligent light switching method provided in this application. As shown in FIG. 12, the method includes but is not limited to the following steps.

S1210: Obtain an image.

Specifically, the intelligent light switching system obtains, in real time by using a video camera module, an image of a scenario in front of an ego vehicle. The image includes but is not limited to ambient light information, and lamp source information such as light information of a vehicle ahead, street lamp information on two sides of a road, and traffic light information.

It may be understood that the video camera module may capture an image in real time based on a preset time, for example, capture an image every $\frac{1}{20}$ s.

In an embodiment of this application, the image obtained by the intelligent light switching system in real time by using the video camera module includes three frames of images. The three frames of images are a short exposure image, an intermediate exposure image, and a long exposure image, respectively. An exposure time of the short exposure image is the shortest, an exposure time of the long exposure image is the longest, and an exposure time of the intermediate exposure image is between the foregoing two exposure times.

It may be understood that the exposure times may be set in a plurality of manners. For example, an exposure time of short exposure is set to 10 ms, an exposure time of intermediate exposure is set to 20 ms, and an exposure time of long exposure is set to 30 ms; or an exposure time of short exposure is set to 5 ms, an exposure time of intermediate exposure is set to 10 ms, and an exposure time of long exposure is set to 20 ms. Therefore, the foregoing short exposure, intermediate exposure, and long exposure are merely relative. Specific exposure times are set by the research and development person based on an actual requirement and experimental data, which is not limited herein.

It should be noted that image features presented by a lamp source vary with exposure times. Using the three frames of images for analysis may help obtain more lamp source information. In another embodiment of this application, more or fewer images may alternatively be obtained for subsequent analysis.

In an embodiment of this application, the image obtained by the intelligent light switching system is an image in an RGB color space, which needs to be converted into an image in a YUV color space.

It should be noted that the foregoing conversion from the RGB color space to the YUV color space is merely an example of this application. In an actual case, there may be another conversion manner, for example, conversion to an HSI color space.

S1220: Calculate an ambient light brightness value corresponding to the image.

Specifically, the intelligent light switching system selects at least one ROI region from the obtained image, obtains a brightness value of each pixel of the selected region, calculates an average brightness value, and then calculates a brightness weighted value based on a specified weight, where the brightness weighted value is the ambient light brightness value. It may be understood that specific parameters, such as a size and a shape, of the selected ROI region are preset by the research and development person based on the image, an actual requirement, and experimental data. This is not limited in this application. It may be understood that the weight is set by the research and development person based on experimental data. This is not limited in this application.

In an embodiment of this application, the central region and an entire image may be selected as the ROI region. The central region is a region in which a headlight of a distant vehicle may appear. As described above, specific parameters, such as a shape and a size, of the central region may be preset by the research and development person based on experimental data.

In an embodiment of this application, a central region, an upper region, and an entire image may be selected as the ROI region. The central region is a region in which a vehicle lamp of a distant vehicle may appear. The upper region is a region in which a street lamp may appear. As described above, specific parameters, such as shapes and sizes, of the central region and the upper region may be preset by the research and development person based on experimental data.

It should be noted that, for an image in a YUV color space, a component Y represents brightness information. Therefore, obtaining a value of a component Y of a pixel in the image may be considered as obtaining a brightness value of the pixel.

For example, the central region and the entire image are selected as the ROI region. Herein, an average brightness value of the central region is calculated to be 200, and an average brightness value of the entire image is calculated to be 120. If specified weights of the central region and the entire image are 3 and 7, the brightness weighted value is calculated as follows: $200 \times 0.3 + 120 \times 0.7 = 144$. Therefore, the brightness weighted value obtained via calculation is 144.

S1230: Classify a lamp source included in the image.

Specifically, the image is input into a lamp source detection model, and a lamp source category in the image is obtained based on the lamp source detection model.

It should be noted that, there is no definite temporal relationship between ambient light brightness calculation and lamp source classification. During actual application, ambient light brightness calculation may be performed first; lamp source classification may be performed first; or the two may be performed simultaneously.

S1240: Determine, based on the ambient light brightness value corresponding to the image and a classification result, whether to switch to a high beam or a low beam.

Specifically, if the ambient light brightness value corresponding to the image is greater than or equal to a sixth threshold, and the lamp source classification result shows that there is indeed a vehicle lamp within the illumination distance of the high beam, it may be considered that the ambient light brightness value is not affected by an interference light source. In this case, it is determined to switch to the low beam. If the ambient light brightness value corresponding to the image is greater than or equal to a sixth threshold, and the lamp source classification result shows that there is no vehicle lamp within the illumination distance of the high beam, it may be considered that the ambient light brightness value is affected by an interference light source. In this case, it is determined to switch to the high beam. If the ambient light brightness value corresponding to the image is less than a sixth threshold, and the lamp source classification result shows that there is no vehicle lamp within the illumination distance of the high beam, it is determined to switch to the high beam. If the ambient light brightness value corresponding to the image is less than a sixth threshold, and the lamp source classification result shows that there is a vehicle lamp within the illumination distance of the high beam, it is determined to switch to the low beam.

It may be understood that the illumination distance of the high beam is set by the research and development person based on an actual requirement and a parameter of the vehicle lamp. This is not limited in this application. In addition, because the video camera obtains an image in real time, and the intelligent light switching system also performs ambient light brightness calculation and lamp source classification in real time, lamp source information and corresponding distance information may be obtained in real time. In an embodiment of this application, a time-lapse switching mode may be set. When the lamp source classification result indicates that a difference between an illumination distance of a high beam of the ego vehicle and a distance between a lamp source and the ego vehicle is within a preset interval, it is determined that switching to the high beam is performed in a delayed manner. It may be understood that the preset interval and the delayed time may be set by the research and development person based on an actual requirement. This is not limited in this application.

It should be noted that the intelligent light switching system may be enabled manually, or may be enabled automatically. A manual enabling manner is applicable to the switching method in S1240. The intelligent light switching system is triggered when a driver determines that a lamp needs to be turned on. If an automatic enabling manner is used, the ambient light brightness may be calculated first. When the brightness is greater than or equal to a seventh threshold, it may be considered that the lamp does not need to be turned on in an environment in which the ego vehicle is located at this time, and then lamp source classification does not need to be performed anymore. Otherwise, lamp source classification is performed, and whether to switch the high beam or the low beam is determined, so that energy consumption can be reduced. Alternatively, a module for calculating ambient light brightness is additionally provided. When the ambient light brightness obtained by the module is greater than or equal to a seventh threshold, it may be considered that the intelligent light switching system does not need to be enabled. Otherwise, the intelligent light switching system is triggered. In this case, the intelligent light switching system may perform switch to the high beam or the low beam according to the method described in S1210 to S1240. It may be understood that the seventh threshold is set by the research and development person based on an actual requirement and experimental data. This is not limited in this application.

Methods in embodiments of this application are described in detail above. For ease of better implementation of the foregoing solutions in the embodiments of this application, the following further provides a related device for cooperative implementation, correspondingly.

FIG. 3 is a schematic diagram of a structure of an intelligent light switching system according to this application. The intelligent light switching system is configured to perform the intelligent light switching method in FIG. 12. Division of functional units of the intelligent light switching system is not limited in this application, and units in the intelligent light switching system may be added, deleted, or combined as required. In addition, operations and/or functions of the units in the intelligent light switching system are respectively used to implement corresponding procedures of the method described in FIG. 12. For brevity, details are not described herein again. FIG. 3 provides an example of functional unit division.

The intelligent light switching system 300 includes an obtaining unit 310, an ambient light detection unit 320, a lamp source classification unit 330, and a switching unit 340.

Specifically, the obtaining unit 310 is configured to: perform the foregoing step S1210, and optionally perform an optional method in the foregoing step.

The ambient light detection unit 320 is configured to: perform the foregoing step S1220, and optionally perform an optional method in the foregoing step.

The lamp source classification unit 330 is configured to: perform the foregoing steps S501 to S511 and S1230, and optionally perform an optional method in the foregoing steps.

The switching unit 340 is configured to: perform the foregoing step S1240, and optionally perform an optional method in the foregoing step.

The four units may perform mutual data communication with each other through a communication channel. It should be understood that the units included in the intelligent light switching system 300 may be software units or hardware units, or some of the units are software units and some of the units are hardware units.

Figure 13:
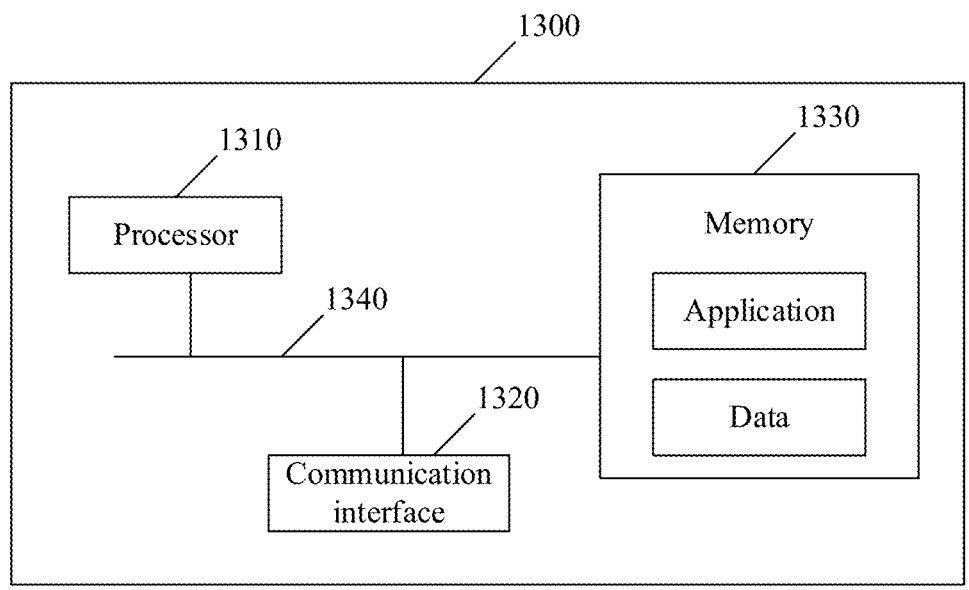
FIG. 13 is a schematic diagram of a structure of a computing device according to an embodiment of this application.

FIG. 13 is a schematic diagram of a structure of a computing device according to an embodiment of this application. As shown in FIG. 13, the computing device 1300 includes a processor 1310, a communication interface 1320, and a memory 1330. The processor 1310, the communication interface 1320, and the memory 1330 are connected to each other by using an internal bus 1340.

The computing device 1300 may be the intelligent light switching system 300 in FIG. 3. A function performed by the intelligent light switching system 300 in FIG. 3 is actually performed by the processor 1310 of the intelligent light switching system 300.

The processor 1310 may include one or more general-purpose processors, for example, a central processing unit (central processing unit, CPU), or a combination of a CPU and a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The communication interface 1320 is configured to communicate with another device or a communication network, such as an Ethernet, a radio access network (RAN), a core network, or a wireless local area network (Wireless Local Area Network, WLAN).

The bus 1340 may be a peripheral component interconnect (peripheral component interconnect, PCI) bus, an extended industry standard architecture (extended industry standard architecture, EISA) bus, or the like. The bus 1340 may be classified into an address bus, a data bus, a control bus, and the like. For ease of representation, only one thick line is used to represent the bus in FIG. 13, but this does not mean that there is only one bus or only one type of bus.

The memory 1330 may include a volatile memory (volatile memory), for example, a random access memory (random access memory, RAM). The memory 1330 may alternatively include a non-volatile memory (non-volatile memory), for example, a read-only memory (ROM), a flash memory (flash memory), a hard disk drive (hard disk drive, HDD), or a solid-state drive (solid-state drive, SSD). The memory 1330 may alternatively include a combination of the foregoing types of memories. The memory 1330 is configured to store program code for executing the foregoing embodiment of the intelligent light switching method. In an implementation, the memory 1330 may further buffer other data, and the processor 1310 controls execution of the data, to implement a functional unit of the intelligent light switching system 300, or implement a method step performed by the intelligent light switching system 300 in the method embodiment shown in FIG. 12.

An embodiment of this application further provides a computer-readable storage medium. The computer-readable storage medium stores a computer program. The program, when executed by a processor, may implement some or all of the steps recorded in any one of the foregoing method embodiments, and a function of any functional unit shown in FIG. 3.

An embodiment of this application further provides a computer program product. When the computer program product runs on a computer or a processor, the computer or the processor performs one or more steps of the method steps that are performed by the intelligent light switching system 300 in any one of the foregoing methods. When the foregoing modules in the device are implemented in a form of a software functional unit and sold or used as an independent product, the modules may be stored in the computer-readable storage medium.

In the foregoing embodiments, the descriptions in the embodiments have respective focuses. For a part that is not described in detail in an embodiment, refer to related descriptions in other embodiments.

It should be further understood that "first", "second", "third", "fourth", and various numbers in this specification are merely used for differentiation for ease of description, and are not construed as any limitation on the scope of this application.

It should be understood that the term "and/or" in this specification describes only an association relationship between associated objects and indicates that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in embodiments of this application. The execution sequences of the processes should be determined according to functions and internal logic of the processes, and should not be construed as any limitation on the implementation processes of embodiments of this application.

Persons of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform some or all of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The steps of the method in embodiments of this application may be sequentially adjusted, combined, or deleted based on an actual requirement.

The modules in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. An intelligent light switching method, wherein the method comprises:
   obtaining an image, wherein the image comprises lamp source information;
   calculating an ambient light brightness value corresponding to the image;
   classifying, based on the lamp source information, a lamp source comprised in the image to obtain a classification result, wherein the classification result is obtained by determining a vanishing point horizontal line (VP) line in the image, wherein the classifying the lamp source comprised in the image to obtain the classification result comprises:
      inputting the image into a lamp source detection model; and
      obtaining a lamp source category in the image based on the lamp source detection model, wherein the obtaining the lamp source category in the image based on the lamp source detection model comprises:
         selecting, from the image, a bright spot whose brightness value is greater than a preset threshold, and setting a lamp box for the bright spot;
         performing pairing on the lamp box to obtain a plurality of lamp box pairs;
         determining the VP line based on the plurality of lamp box pairs, wherein the VP line is used to distinguish between a first region and a second region of the image; and
         classifying the bright spot based on a position relationship between the bright spot and the VP line and a color feature of the bright spot, to obtain different lamp source categories; and
   performing light switching based on the ambient light brightness value corresponding to the image and the classification result.

2. The method according to claim 1, wherein the calculating an ambient light brightness value corresponding to the image comprises:
   selecting at least one region from the image, and calculating a brightness value of the at least one region; and
   calculating, based on the brightness value of the at least one region, the ambient light brightness value corresponding to the image.

3. The method according to claim 1, wherein
   the lamp source detection model is trained by using a plurality of sample images, wherein each of the plurality of sample images comprises a lamp source and annotation information of the lamp source.

4. The method according to claim 1, wherein before the performing pairing on the lamp box, the method further comprises:
   performing overlap removal on the lamp box, to ensure that there is no overlap or tangent between lamp boxes.

5. The method according to claim 1, wherein the determining a vanishing point horizontal line VP line based on the plurality of lamp box pairs comprises:
   mapping lamp box centers of the lamp box pairs onto rows in the image, to obtain an in-row quantity distribution map of the lamp box pairs;
   selecting a VP line based on the in-row quantity distribution map;
   correcting the VP line based on a preset correction value, to obtain a corrected VP line; and
   adjusting the corrected VP line by using a reference value, to obtain a VP line used to classify the bright spot, wherein the reference value is used to describe a change of a pitch angle of a video camera that captured the image.

6. An apparatus, comprising:
   at least one processor; and
   one or more memories coupled to the at least one processor and storing programming instructions for execution by the at least one processor to:
   obtain an image, wherein the image comprises lamp source information;
   calculate an ambient light brightness value corresponding to the image;
   classify based on the lamp source information a lamp source comprised in the image to obtain a classification result, wherein the classification result is obtained by determining a vanishing point horizontal line (VP) line in the image, wherein the classify the lamp source comprised in the image to obtain the classification result comprises:
      input the image into a lamp source detection model; and
      obtain a lamp source category in the image based on the lamp source detection model, wherein the obtain the lamp source category in the image based on the lamp source detection model comprises:
         select, from the image, a bright spot whose brightness value is greater than a preset threshold, and setting a lamp box for the bright spot;
         perform pairing on the lamp box to obtain a plurality of lamp box pairs;
         determine the VP line based on the plurality of lamp box pairs, wherein the VP line is used to distinguish between a first region and a second region of the image; and
         classify the bright spot based on a position relationship between the bright spot and the VP line and a color feature of the bright spot, to obtain different lamp source categories; and
      perform light switching based on the ambient light brightness value corresponding to the image and the classification result.

7. The apparatus according to claim 6, wherein the calculate an ambient light brightness value corresponding to the image comprises:
   select at least one region from the image, and calculating a brightness value of the at least one region; and
   calculate based on the brightness value of the at least one region the ambient light brightness value corresponding to the image.

8. The apparatus according to claim 6, wherein the lamp source detection model is trained by using a plurality of sample images, wherein each of the plurality of sample images comprises a lamp source and annotation information of the lamp source.

9. The apparatus according to claim 6, wherein before the perform pairing on the lamp box, the instructions further cause the apparatus to:
   perform overlap removal on the lamp box, to ensure that there is no overlap or tangent between lamp boxes.

10. The apparatus according to claim 6, wherein the determine a vanishing point horizontal line VP line based on the plurality of lamp box pairs comprises:

map lamp box centers of the lamp box pairs onto rows in the image, to obtain an in-row quantity distribution map of the lamp box pairs;

select a VP line based on the in-row quantity distribution map;

correct the VP line based on a preset correction value, to obtain a corrected VP line; and adjust the corrected VP line by using a reference value, to obtain a VP line used to classify the bright spot, wherein the reference value is used to describe a change of a pitch angle of a video camera that captured the image.

11. The method according to claim 1, wherein the image is captured by a video camera disposed at a fixed position of a vehicle.

12. The apparatus according to claim 6, wherein the image is captured by a video camera disposed at a fixed position of a vehicle.

13. A non-transitory computer-readable medium storing computer instructions, that when executed by one or more processors, cause the one or more processors to perform operations comprising:

obtaining an image, wherein the image comprises lamp source information;

calculating an ambient light brightness value corresponding to the image;

classifying, based on the lamp source information, a lamp source comprised in the image to obtain a classification result, wherein the classification result is obtained by determining a vanishing point horizontal line (VP) line in the image, wherein the classifying the lamp source comprised in the image to obtain the classification result comprises:

inputting the image into a lamp source detection model; and obtaining a lamp source category in the image based on the lamp source detection model, wherein the obtaining the lamp source category in the image based on the lamp source detection model comprises:

selecting, from the image, a bright spot whose brightness value is greater than a preset threshold, and setting a lamp box for the bright spot;

performing pairing on the lamp box to obtain a plurality of lamp box pairs;

determining the VP line based on the plurality of lamp box pairs, wherein the VP line is used to distinguish between a first region and a second region of the image; and classifying the bright spot based on a position relationship between the bright spot and the VP line and a color feature of the bright spot, to obtain different lamp source categories; and performing light switching based on the ambient light brightness value corresponding to the image and the classification result.

14. The non-transitory computer-readable medium according to claim 13, wherein the calculating an ambient light brightness value corresponding to the image comprises:

selecting at least one region from the image, and calculating a brightness value of the at least one region; and calculating, based on the brightness value of the at least one region, the ambient light brightness value corresponding to the image.

15. The non-transitory computer-readable medium according to claim 13, wherein the lamp source detection model is trained by using a plurality of sample images, wherein each of the plurality of sample images comprises a lamp source and annotation information of the lamp source.

16. The non-transitory computer-readable medium according to claim 13, wherein the operations comprise:

before the performing pairing on the lamp box, performing overlap removal on the lamp box, to ensure that there is no overlap or tangent between lamp boxes.

17. The non-transitory computer-readable medium according to claim 13, wherein the determining a vanishing point horizontal line VP line based on the plurality of lamp box pairs comprises:

mapping lamp box centers of the lamp box pairs onto rows in the image, to obtain an in-row quantity distribution map of the lamp box pairs;

selecting a VP line based on the in-row quantity distribution map;

correcting the VP line based on a preset correction value, to obtain a corrected VP line; and adjusting the corrected VP line by using a reference value, to obtain a VP line used to classify the bright spot, wherein the reference value is used to describe a change of a pitch angle of a video camera that captured the image.

18. The non-transitory computer-readable medium according to claim 13, wherein the image is captured by a video camera disposed at a fixed position of a vehicle.

* * * * *